US009967065B2

(12) United States Patent
Nuzman et al.

(10) Patent No.: US 9,967,065 B2
(45) Date of Patent: May 8, 2018

(54) FREQUENCY DIVISION DUPLEX (FDD) MIMO BACKHAUL FOR COMMUNICATION TERMINALS

(71) Applicant: Alcatel-Lucent USA Inc., Murray Hill, NJ (US)

(72) Inventors: Carl J. Nuzman, Union, NJ (US); Thomas Louis Marzetta, Summit, NJ (US); Alexei Ashikhmin, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 192 days.

(21) Appl. No.: 15/134,816

(22) Filed: Apr. 21, 2016

(65) Prior Publication Data
US 2017/0310436 A1  Oct. 26, 2017

(51) Int. Cl.
*H04W 4/00* (2009.01)
*H04L 5/00* (2006.01)
(Continued)

(52) U.S. Cl.
CPC .......... *H04L 5/0023* (2013.01); *H04L 5/0048* (2013.01); *H04L 5/14* (2013.01); *H04W 72/0406* (2013.01)

(58) Field of Classification Search
CPC ....... H04L 5/0023; H04L 5/14; H04L 5/0048; H04W 72/0406
See application file for complete search history.

(56) References Cited

U.S. PATENT DOCUMENTS

| 2004/0110524 A1* | 6/2004 | Takano | H04W 36/30 455/522 |
| 2011/0292858 A1* | 12/2011 | Jones | H04W 72/005 370/312 |

(Continued)

FOREIGN PATENT DOCUMENTS

| EP | 3154232 A1 | 4/2017 |
| WO | WO-2016/075537 A1 | 5/2016 |

OTHER PUBLICATIONS

International Search Report and Written Opinion for International Application No. PCT/US2017/025676 dated Jun. 30, 2017.

(Continued)

*Primary Examiner* — Clemence S Han
(74) *Attorney, Agent, or Firm* — Harness, Dickey & Pierce, P.L.C.

(57) ABSTRACT

A central node of a MIMO system may transmit, to one or more communication terminals of the MIMO system, a long-duration downlink pilot signal carrying a pilot sequence having a first duration. The first duration may be equal to or greater than a quantity of antennas of the central node. The central node may receive retransmitted long-duration downlink pilot signals from the communication terminals. The central node may further transmit, to one or more communication terminals, a short-duration downlink pilot signal carrying a pilot sequence having a second duration. The second duration may be less than or equal to the quantity of antennas. The central node may receive a retransmitted short-duration downlink pilot signal from the one or more communication terminals. An uplink and downlink between the central node and one or more communication terminals may be estimated based on the received signals.

20 Claims, 5 Drawing Sheets

(51) Int. Cl.
*H04L 5/14* (2006.01)
*H04W 72/04* (2009.01)

(56) References Cited

U.S. PATENT DOCUMENTS

| | | |
|---|---|---|
| 2013/0070621 A1 | 3/2013 | Marzetta et al. |
| 2015/0103934 A1* | 4/2015 | Nam .................. H04B 7/0413 375/260 |
| 2016/0134438 A1 | 5/2016 | Marzetta et al. |
| 2016/0227577 A1* | 8/2016 | Ashikhmin .......... H04B 7/0417 |

OTHER PUBLICATIONS

Hien Quoc Ngo et al., "Cell-Free Massive MIMO versus Small Cells," arxiv.org, Cornell University, Ithaca, New York, 14853, XP080686145, Feb. 26, 2016, pp. 1-30.

* cited by examiner

FREQUENCY DIVISION DUPLEX (FDD) MIMO BACKHAUL FOR COMMUNICATION TERMINALS

BACKGROUND

Small cells are thought by many to be a promising component of future 5$^{th}$ Generation (5G) wireless systems. However, the potential of small cells can only be realized if installation costs can be controlled.

Two essential requirements for a small cell installation are electrical power and backhaul, which when provided by wired connections are often costly. A wired connection for electrical power may be eliminated by charging storage batteries using power derived from, for example, a small wind turbine and/or solar panel, while minimizing internal power consumption. The wired backhaul connection may be eliminated by using a wireless backhaul.

A relay cell has been proposed to reduce internal power consumption at a small cell. On the downlink, the relay cell receives a complex-valued analog baseband signal on a carrier frequency from a backhaul link and retransmits the baseband signal at an access carrier frequency that accommodates one or more users attached to the relay cell. On the uplink, the relay cell receives combined transmitted signals from one or more users on an access link, and retransmits the combined baseband signals on the backhaul uplink. This type of relay cell is designed for relatively low-power operation.

Conventional wireless backhaul connections may be provided either by radio frequencies between about 0.8 to 6.0 GHz (e.g., Wi-Fi) or by millimeter-wave technology. While both of these technologies may be practical under certain operating conditions, each also has limitations. For radio frequencies between about 0.8 to 6.0 GHz, under non line-of-sight conditions, the required radiated power for the uplink increases approximately 10 decibels (dB) for every doubling of range (with an assumed loss-exponent of about 3.5). This limits the operating range of backhaul connections using these frequency bands, and hence the flexibility of small cell deployment using this technology. Millimeter-wave backhaul connections take advantage of physically small high-gain dish antennas to compensate for range-induced attenuation loss. However, millimeter-wave links are generally limited to line-of-sight propagation and require relatively tight alignment of antennas, which again limits the flexibility of deployment. Moreover, millimeter-wave links are not considered "all-weather".

SUMMARY

At least some example embodiments provide a form of Massive MIMO (also referred to as "Large-Scale Antenna Systems") for wireless backhaul connections between relay cells (also referred to as "repeater-type small cells", "repeater small cells", etc.) and a backhaul network. A single Massive MIMO base station may provide simultaneous and/or concurrent backhaul connections to a plurality of relay cells by virtue of its spectral efficiency.

At least some example embodiments provide a frequency-division duplex (FDD) Massive MIMO backhaul link for a multiplicity of "all-analog" relay cells, also referred to herein interchangeably as communication terminals.

Having a disproportionately greater number of service antennas in the Massive MIMO array relative to relay cells (e.g., in at least a four-to-one (4:1) ratio of antennas to relay cells) lends relatively high simplicity and robustness to the pre-coding and decoding at the central node.

One or more example embodiments also provide relay cells with wireless backhaul links. One or more example embodiments discussed herein solve an incompatibility problem between prior art repeater small cells and prior art point-to-multipoint backhaul connections.

According to at least one example embodiment, a method for channel estimation in a multiple-input-multiple-output (MIMO) system may include transmitting, by the central node to the plurality of communication terminals simultaneously on separate, respective downlinks of the MIMO system, a long-duration downlink pilot signal carrying a first pilot sequence of a first duration, the first duration being equal to or greater than a quantity of antennas in the antenna array; receiving, at the central node, a long-duration uplink pilot signal as a plurality of long-duration signals transmitted substantially simultaneously by the plurality of communication terminals on separate, respective uplinks of the MIMO system, each long-duration signal of the plurality of long-duration signals being a retransmission of the long-duration downlink pilot signal by a separate communication terminal of the plurality of communication terminals, each long-duration signal carrying the first pilot sequence; correlating, at the central node, the received long-duration uplink pilot signal with at least one pilot sequence in the first set of pilot sequences to generate a pilot signal matrix; transmitting, by the central node to at least one communication terminal of the plurality of communication terminals on at least one respective downlink of the MIMO system, a short-duration downlink pilot signal carrying a second pilot sequence of a second duration, the second duration being less than or equal to the quantity of antennas in the antenna array; receiving, at the central node, a short-duration uplink pilot signal carrying the second pilot sequence transmitted by the at least one communication terminal on at least one respective uplink of the MIMO system, the received short-duration uplink pilot signal being a retransmission of the short-duration downlink pilot signal; and estimating an uplink channel between the central node and the at least one communication terminal based on the pilot signal matrix and the received short-duration uplink pilot signal. The MIMO system may include a central node and a plurality of communication terminals, the central node including an antenna array.

The second pilot sequence may be based on the received long-duration uplink pilot signal.

The method may include iteratively performing, for each given communication terminal of the plurality of communication terminals: transmitting the short-duration downlink pilot signal to the given communication terminal; receiving the short-duration uplink pilot signal from the given communication terminal; and estimating an uplink channel between the central node and the given communication terminal based on the pilot signal matrix and the short-duration uplink pilot signal received from the given communication terminal.

The method may include transmitting, by the central node to each communication terminal on separate, respective downlinks of the MIMO system, a sequence of short-duration downlink pilot signals; receiving separate sequences of short-duration uplink pilot signals from each of the communication terminals, wherein each separate sequence of short-duration uplink pilot signals includes a retransmission of a separate selection of the short-duration downlink pilot signals received at a separate communication terminal of the plurality of communication terminals, each separate selection being according to a particular orthogonal code associated with the respective communication terminal; and estimating a plurality of uplink channels between the central node and separate, respective communication terminals of the plurality of communication terminals based on the pilot signal matrix and the sequences of short-duration uplink pilot signals received from the communication terminals.

Each particular orthogonal code may be a Walsh-Hadamard code.

Each particular Walsh-Hadamard code may include a modulated value sequence such that each value in the sequence is 0 or 1.

The second set of pilot sequences of the short-duration downlink pilot signal is generated based on a singular value decomposition of the received long-duration uplink pilot signal, such that the short-duration downlink pilot signal is restricted to a particular subspace associated with a downlink channel between the central node and the communication terminal and the short-duration uplink pilot signal is processed according to the subspace associated with the uplink channel.

The method may include receiving the short-duration uplink pilot signal as a plurality of short-duration signals transmitted sequentially by the plurality of communication terminals on separate, respective uplinks of the MIMO system, each short-duration signal of the plurality of short-duration signals being a retransmission of the short-duration downlink pilot signal received at a separate communication terminal of the plurality of communication terminals. The method may further include generating, for each communication terminal, a first downlink channel estimate and a first uplink channel estimate based on a singular value decomposition of the plurality of signals received from the plurality of communication terminals, respectively; generating, for each communication terminal, a second downlink channel estimate and a second uplink channel estimate based on a matrix of the first downlink channel estimates of the communication terminals and a matrix of the first uplink channel estimates of the communication terminals, respectively; calculating, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal; generating, for each communication terminal, a third downlink channel estimate based on the first and second downlink channel estimates and the downlink argument of the respective communication terminal; and generating, for each communication terminal, a third uplink channel estimate based on the first and second uplink channel estimates and the uplink argument of the respective communication terminal.

The first set of pilot sequences of the first duration may be mutually orthogonal in at least one of a frequency domain and a time domain.

The method may include estimating a downlink channel between the central node and the communication terminal based on the pilot signal matrix and the estimated uplink channel.

Each signal of the plurality of signals may be a frequency converted retransmission of the long-duration downlink pilot signal received at a separate communication terminal of the communication terminals, and the received short-duration uplink pilot signal may be a frequency converted retransmission of the short-duration downlink pilot signal.

The MIMO system may be a Massive MIMO system, and each communication terminal is a small cell repeater terminal.

According to at least one example embodiment, an apparatus may include a memory having computer-readable instructions stored therein, and a processor configured to execute the computer-readable instructions. The processor may be configured to execute the computer-readable instructions to generate a long-duration downlink pilot signal for transmission by an antenna array to a plurality of communication terminals simultaneously on separate, respective downlinks, the long-duration downlink pilot signal carrying a first set of pilot sequences of a first duration, the first duration being equal to or greater than a quantity of antennas in the antenna array; receive a long-duration uplink pilot signal from the antenna array based on the long-duration uplink pilot signal being received at the antenna array from the plurality of communication terminals on separate, respective uplinks, the long-duration uplink pilot signal being received at the antenna array as a plurality of long-duration signals transmitted substantially simultaneously by the plurality of communication terminals on separate, respective uplinks, each long-duration signal of the plurality of long-duration signals being a retransmission of the long-duration downlink pilot signal by a separate communication terminal of the plurality of communication terminals, each long-duration signal carrying the first set of pilot sequences; correlate the received long-duration uplink pilot signal with at least one pilot sequence in the first set of pilot sequences to generate a pilot signal matrix; generate a short-duration downlink pilot signal for transmission by the antenna array to at least one communication terminal of the plurality of communication terminals on at least one respective downlink, the short-duration downlink pilot signal carrying a second set of pilot sequences of a second duration, the second duration being less than or equal to the quantity of antennas in the antenna array; receive a short-duration uplink pilot signal from the antenna array based on the short-duration uplink pilot signal being received at the antenna array from the at least one communication terminal on at least one respective uplink, the short-duration uplink pilot signal carrying the second set of pilot sequences, the received short-duration uplink pilot signal being a retransmission of the short-duration downlink pilot signal; and estimate an uplink channel between the central node and the at least one communication terminal based on the pilot signal matrix and the received short-duration uplink pilot signal.

The processor may be configured to execute the computer-readable instructions to iteratively perform, for each given communication terminal of the plurality of communication terminals, command the antenna array to transmit the short-duration downlink pilot signal to the given communication terminal; receive the short-duration uplink pilot signal from the antenna array based on the short-duration uplink signal being received at the antenna array from the given communication terminal; and estimate an uplink channel between the central node and the given communication terminal based on the pilot signal matrix and the short-duration uplink pilot signal received from the given communication terminal.

The processor may be configured to execute the computer-readable instructions to generate a sequence of short-duration downlink pilot signals for transmission by the antenna array to each communication terminal of the plurality of communication terminals simultaneously on separate, respective downlinks; and receive separate sequences of short-duration uplink pilot signals from the antenna array based on the separate sequences of short-duration uplink pilot signals being received at the antenna array from each of the communication terminals, wherein each separate sequence of short-duration uplink pilot signals includes a retransmission of a separate selection of the short-duration downlink pilot signals received at a separate communication terminal of the plurality of communication terminals, each separate selection being according to a particular orthogonal code associated with the respective communication terminal; and estimate a plurality of uplink channels between the central node and separate, respective communication terminals of the plurality of communication terminals based on the pilot signal matrix and the sequences of short-duration uplink pilot signals received from the communication terminals.

the second set of pilot sequences of the short-duration downlink pilot signal may be generated based on a singular value decomposition of the received long-duration uplink pilot signal, such that the short-duration downlink pilot signal is restricted to a particular subspace associated with a downlink channel between the central node and the communication terminal and the short-duration uplink pilot signal is processed according to a subspace associated with the uplink channel.

The processor may be configured to execute the computer-readable instructions to receive the short-duration uplink pilot signal from the antenna array based on the short-duration uplink pilot signal being received at the antenna array as a plurality of uplink signals transmitted sequentially by the plurality of communication terminals on separate, respective uplinks, each uplink signal of the plurality of uplink signals being a retransmission of the short-duration downlink pilot signal received at a separate communication terminal of the plurality of communication terminals. The processor may be further configured to execute the computer-readable instructions to generate, for each communication terminal, a first downlink channel estimate and a first uplink channel estimate based on a singular value decomposition of the plurality of signals received from the plurality of communication terminals, respectively, generate, for each communication terminal, a second downlink channel estimate and a second uplink channel estimate based on a matrix of the first downlink channel estimates of the communication terminals and a matrix of the first uplink channel estimates of the communication terminals, respectively, calculate, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal, generate, for each communication terminal, a third downlink channel estimate based on the first and second downlink channel estimates and the downlink argument of the respective communication terminal, and generate, for each communication terminal, a third uplink channel estimate based on the first and second uplink channel estimates and the uplink argument of the respective communication terminal.

According to at least one example embodiment, a non-transitory computer readable storage medium may store one or more program instructions, the program instructions being executable by a computer system to cause the computer system to: generate a long-duration downlink pilot signal for transmission by an antenna array to a plurality of communication terminals simultaneously on separate, respective downlinks, the long-duration downlink pilot signal carrying a first set of pilot sequences of a first duration, the first duration being equal to or greater than a quantity of antennas in the antenna array; receive a long-duration uplink pilot signal from the antenna array based on the long-duration uplink pilot signal being received at the antenna array from the plurality of communication terminals on separate, respective uplinks, the long-duration uplink pilot signal being received at the antenna array as a plurality of long-duration signals transmitted substantially simultaneously by the plurality of communication terminals on separate, respective uplinks, each long-duration signal of the plurality of long-duration signals being a retransmission of the long-duration downlink pilot signal by a separate communication terminal of the plurality of communication terminals, each long-duration signal carrying the first set of pilot sequences; correlate the received long-duration uplink pilot signal with at least one pilot sequence in the first set of pilot sequences to generate a pilot signal matrix; generate a short-duration downlink pilot signal for transmission by the antenna array to at least one communication terminal of the plurality of communication terminals on at least one respective downlink, the short-duration downlink pilot signal carrying a second set of pilot sequences of a second duration, the second duration being less than or equal to the quantity of antennas in the antenna array; receive a short-duration uplink pilot signal from the antenna array based on the short-duration uplink pilot signal being received at the antenna array from the at least one communication terminal on at least one respective uplink, the short-duration uplink pilot signal carrying the second set of pilot sequences, the received short-duration uplink pilot signal being a retransmission of the short-duration downlink pilot signal; and estimate an uplink channel between a central node and the at least one communication terminal based on the pilot signal matrix and the received short-duration uplink pilot signal.

The program instructions may be executable by the computer system to cause the computer system to receive the short-duration uplink pilot signal from the antenna array based on the short-duration uplink pilot signal being received at the antenna array as a plurality of uplink signals transmitted sequentially by the plurality of communication terminals on separate, respective uplinks, each uplink signal of the plurality of uplink signals being a retransmission of the short-duration downlink pilot signal received at a separate communication terminal of the plurality of communication terminals. The program instructions may be further executable by the computer system to cause the computer system to: generate, for each communication terminal, a first downlink channel estimate and a first uplink channel estimate based on a singular value decomposition of the plurality of signals received from the plurality of communication terminals, respectively; generate, for each communication terminal, a second downlink channel estimate and a second uplink channel estimate based on a matrix of the first downlink channel estimates of the communication terminals and a matrix of the first uplink channel estimates of the communication terminals, respectively; calculate, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal; generate, for each communication terminal, a third downlink channel estimate based on the first and second downlink channel estimates and the downlink argument of the respective communication terminal; and generate, for each communication terminal, a third uplink channel estimate based on the first and second uplink channel estimates and the uplink argument of the respective communication terminal.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
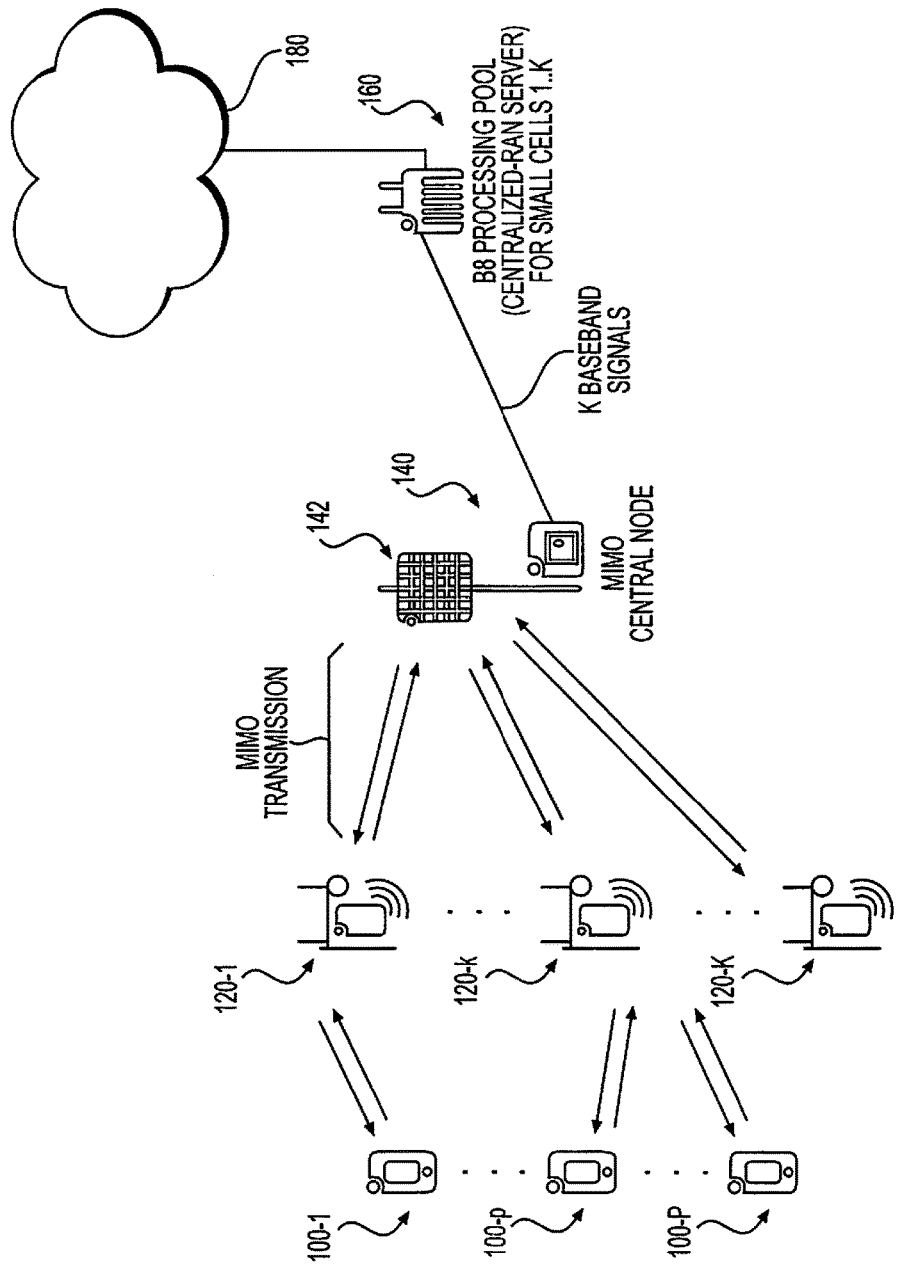
FIG. 1 illustrates a communications network with a backhaul system architecture having a Multiple-Input-Multiple-Output (MIMO) wireless backhaul link, according to some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, relay cells, central nodes, centralized RAN servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "central node" may be considered synonymous to, and may hereafter be occasionally referred to as a base station, NodeB, eNodeB, eNB, transceiver station, base transceiver station (BTS), etc. As discussed herein, the central node may have all functionally associated with conventional central nodes in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network. User equipment may include one or more of: Long Term Evolution (LTE) user equipment, machine-to-machine (M2M) devices, smartphones, mobile terminals, WiFi sticks, sensors with radio transceivers, 5G transceivers, 5G radio terminals, some combination thereof, or the like.

As discussed herein, uplink (or reverse link) transmissions refer to transmissions from user equipment (UE) to network, whereas downlink (or forward link) transmissions refer to transmissions from network to UE.

According to example embodiments, existing radio access network (RAN) elements, relay cells, central nodes, centralized RAN servers, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein existing radio access network (RAN) elements, relay cells, central nodes, centralized RAN servers, etc. may be any physical computer hardware system including one or more processors, various interfaces, a computer readable medium, and (optionally) a display device. The one or more interfaces may be configured to transmit/receive (wireline or wirelessly) data signals to/from one or more other network elements; and to transmit/receive (wireline or wirelessly) controls signals to/from other network elements. In at least one example, the functionality of the existing radio access network (RAN) elements, relay cells, central nodes, centralized RAN servers, etc. may be executed on the one or more processors and the various interfaces.

Although one or more example embodiments may be discussed herein with regard to relatively specific frequencies (e.g., 5.5 GHz, 2.0 GHz, 2.1 GHz, etc.), example embodiments should not be limited to these example frequencies. Example embodiments may be applicable at other frequencies, as would be recognized by one of ordinary skill in the art.

In North America and Europe most cellular access systems and user terminals (e.g., smartphones) utilize frequency-division duplexing (FDD), having dual uplink and downlink access channels in disjoint frequency bands. As a result, the most commercially attractive relay cell for a MIMO system is one that utilizes FDD. The MIMO system may be a Massive MIMO system.

However, to use a conventional time-division duplexed (TDD) backhaul connection with a FDD relay cell, the relay cell may buffer and multiplex the simultaneous uplink and downlink access streams into a single time-multiplexed backhaul stream. A FDD backhaul link that provides simultaneous uplink and downlink transmission may avoid this power-costly buffering within the relay cell.

At least one example embodiment provides at least a portion of a MIMO system, including a central node thereof, that utilizes FDD to enable simultaneous uplink and downlink transmission and avoid the above-mentioned power-costly buffering within the relay cell.

In at least one example embodiment of a Massive MIMO system, an antenna array (sometimes referred to herein as a Massive MIMO antenna array or Massive MIMO array) including a relatively large number ("quantity") of physically relatively small, low-gain antennas serves a multiplicity of terminals (also referred to herein as communication terminals) where all of the terminals utilize all of the time/frequency resources. In one example, a communication terminal is built into each of a plurality of relay cells to provide a backhaul link between users and the backhaul network.

On the downlink, a Massive MIMO central node (also sometimes referred to as a Massive MIMO base station) may transmit simultaneous data-bearing signals via the Massive MIMO antenna array to the multiplicity of relay cells such that each relay cell receives substantially only the signal intended for that relay cell with minimal interference from signals intended for other relay cells.

On the uplink, the Massive MIMO central node may receive, via the Massive MIMO array, the superposition of data-bearing signals transmitted by the relay cells. The received signals may be modified by the propagation channels between the relay cells and the Massive MIMO central node. The Massive MIMO central node may process the received signals to recover the individual signals from each of the relay cells.

On both the uplink and the downlink, the Massive MIMO central node may utilize knowledge of the frequency responses of the propagation channels (also referred to as channel estimates, channel knowledge or channel state information (CSI)) that connect each of the antennas to each of the relay cells to perform pre-coding of signals prior to transmitting the signals to the relay cells as well as decoding of signals received from the relay cells.

Channel knowledge may be acquired (e.g., "generated") by employing time-division duplexing (TDD) and uplink pilot signals (also referred to as "pilots"). In at least one example embodiment, relay cells ("communication terminals") transmit known, mutually orthogonal pilot sequences on the uplink, and the Massive MIMO central node estimates the uplink channels from its received pilot signals, which by virtue of TDD reciprocity are equal to the downlink channels. In this example, the time required for training is proportional to the number of terminals and is independent of the number of service antennas in the Massive MIMO array.

In at least one example embodiment, the channel knowledge (also referred to herein as channel estimates or channel state information (CSI)) are acquired (e.g., "generated") by employing frequency division duplexing (FDD) during a training phase in which a Massive MIMO central node successively transmits pilot signals to each of the relay cells connected to the Massive MIMO central node, and the relay cells successively retransmit the received pilot signal back to the Massive MIMO central node one at a time such that only one of the relay cells retransmits the pilot signal at any given time. The training phase as well as example operation of the Massive MIMO central node and the relay cells during the training phase will be discussed in more detail later.

According to at least one example embodiment, the Massive MIMO central node utilizes a trigger signal to set the relay cells into a training mode (also referred to herein as the calibration mode). To maintain relatively low power consumption at the relay cells, complex processing of the data stream at the relay cells is avoided as much as possible and the majority, if not all, of the complexity of Massive MIMO processing resides in the Massive MIMO central node. With regard to the training phase, for example, to maintain relatively low power consumption an off-band signal with very low transmission rate and simple modulation and coding may be used as the trigger signal to set the relay cells into the training mode. This trigger signal includes an individual code sequence for each of the relay cells, causing each of the relay cells to successively and/or sequentially switch into the pilot retransmission mode (also referred to as the active training mode) for one pilot duration. As mentioned above, when set into the training mode during the training phase, the relay cells retransmit the pilot signal received from the central node one at a time such that only one of the relay cells retransmits the pilot signal at any given time during the training phase. In one example, the pilot duration τ may be equal or substantially equal to the duration of one 3GPP-LTE subframe (e.g., about 1 millisecond). However, multiple pilot sequences may be transmitted within the 1 millisecond for redundancy and/or noise mitigation.

According to at least one example embodiment, an in-band signal with very low transmission rate and simple modulation and coding may be used as the trigger signal to set the relay cells into the training mode.

According to at least one example embodiment, the trigger signal is not transmitted with the bandwidth, array gain and directivity of the Massive MIMO antenna array, but in a narrowband auxiliary control channel with an omni-directional antenna pattern. As an alternative, the trigger signal may be transmitted with a single array antenna or a patch antenna. The trigger signal may contain more code sequences than attached relay cells, so that newly added relay cells may be added to the system without pre-configuration of the newly added relay cells' ID. Further, the trigger signal may contain additional bits of information for redundancy, security, power control or other reasons.

FIG. 1 illustrates a communications network with a backhaul system architecture having a MIMO wireless backhaul link. The architecture may include a Massive MIMO wireless backhaul link.

Referring to FIG. 1, the communications network includes: a MIMO system central node 140 (also sometimes referred to herein as a MIMO system base station); a centralized radio access network (RAN) server 160; a plurality of relay cells 120-1, . . . , 120-k, . . . , 120-K; and a core network 180. FIG. 1 also illustrates a plurality of instances of user equipment (UEs) 100-1, . . . , 100-p, . . . , 100-P that are served by the relay cells 120-1 through 120-K. In some example embodiments, the MIMO system central node 140 may be a Massive MIMO central node (also sometimes referred to herein as a Massive MIMO base station).

As discussed herein, a relay cell may also be referred to as a repeater small cell, a repeater-type small cell, a small cell repeater terminal, a repeater small cell terminal, and a communication terminal.

According to at least one example embodiment, the centralized RAN server 160 includes a pool of baseband (BB) processors (also referred to herein as a baseband processing pool) for the relay cells 120-1 through 120-K. Similar to operations performed separately at a plurality of conventional base stations for respective coverage areas, the centralized RAN server 160 performs scheduling, modulation and coding and power control for the UEs 100-1 through 100-P served by the relay cells 120-1 through 120-K. More concisely, the centralized RAN server 160 generates downlink signals for the relay cells 120-1 through 120-K to transmit to UEs, and processes uplink signals from the relay cells for further transmission through the core network. Because operations such as these are well-known, a more detailed discussion is omitted.

The centralized RAN server 160 is communicatively coupled to the MIMO system central node 140 through, for example, a wired backhaul link. In one example, the centralized RAN server 160 transmits and receives multiple baseband signals (e.g., 3rd Generation Partnership Project Long-Term Evolution (3GPP LTE) baseband signals) to and from the MIMO system central node 140 through the wired backhaul link over the common public radio interface (CPRI).

Still referring to FIG. 1, the MIMO system central node 140 includes a MIMO antenna array (also sometimes referred to herein as a "Large-Scale Antenna Array" and/or an "antenna array") 142 along with associated electronics and signal processing (discussed in more detail later). Where the MIMO system central node 140 is a Massive MIMO central node, the MIMO antenna array may be a Massive MIMO antenna array.

In at least one example embodiment, the MIMO antenna array 142 includes M antennas (is an M-element antenna array) that is/are configured to provide a wireless backhaul link for the K relay cells 120-1 through 120-K. In this example, M and K may be real or natural numbers ("quantities"), where M may be greater than or equal to 2. In a still more specific example, the MIMO antenna array 142 may have 64 antennas (i.e., M is 64), and 16 relay cells may be connected to the MIMO system central node 140 (i.e., K is 16). Example operation of the MIMO array 142 and the MIMO system central node 140 will be discussed in more detail later. In addition to the functionality discussed herein, the MIMO system central node 140 may also have all conventional functionality as is well-known in the art.

The MIMO system central node 140, according to at least one example embodiment, utilizes FDD so there are two disjoint bands of frequency for the backhaul service. These bands of frequency are also disjoint from the two bands of frequency that the relay cells use for access service. Moreover, using FDD at the MIMO system central node 140 and the MIMO array 142 enables simultaneous uplink and downlink backhaul transmission between the MIMO array 142 and the relay cells 120-1 through 120-K.

According to at least one example embodiment, the MIMO system central node 140 and relay cells 120-1 through 120-K function in two modes: 1) a training mode (also referred to as a calibration mode) in which the MIMO system central node 140 obtains channel knowledge (also referred to as channel estimates or channel state information (CSI)) for uplink and downlink propagation channels between the MIMO array 142 and the relay cells 120-1 through 120-K; and 2) a normal transmission mode in which the MIMO system central node 140 and relay cells 120-1 through 120-K perform normal backhaul transmission and reception of signals to and from UEs served by the K relay cells 120-1 through 120-K. In both the training mode and the normal transmission mode, orthogonal frequency division multiplexing (OFDM) may be employed for transmission and reception of signals on the uplink and downlink. Moreover, since the system is a FDD system, uplink and downlink transmission occurs concurrently or simultaneously. It will be understood, however, that some example embodiments are not limited to employing OFDM for transmission and reception of signals on the uplink and downlink. Some example embodiments may operate independently of (e.g., 'without') OFDM.

The MIMO system central node 140 is communicatively coupled to the plurality of relay cells 120-1 through 120-K via a MIMO backhaul link. If and/or when the MIMO system central node 140 is a Massive MIMO central node, the Massive MIMO central node 140 may be communicatively coupled to the plurality of relay cells 120-1 through 120-K via a Massive MIMO backhaul link.

In at least one example embodiment, the backhaul link may also be referred to as a fronthaul link. In one example, the MIMO system central node 140 transmits and receives information to and from the plurality of relay cells 120-1 through 120-K over, for example, 2 GHz and/or 5 GHz channels. Example operation of the relay cells 120-1 through 120-K will be discussed in more detail later.

Figure 2:
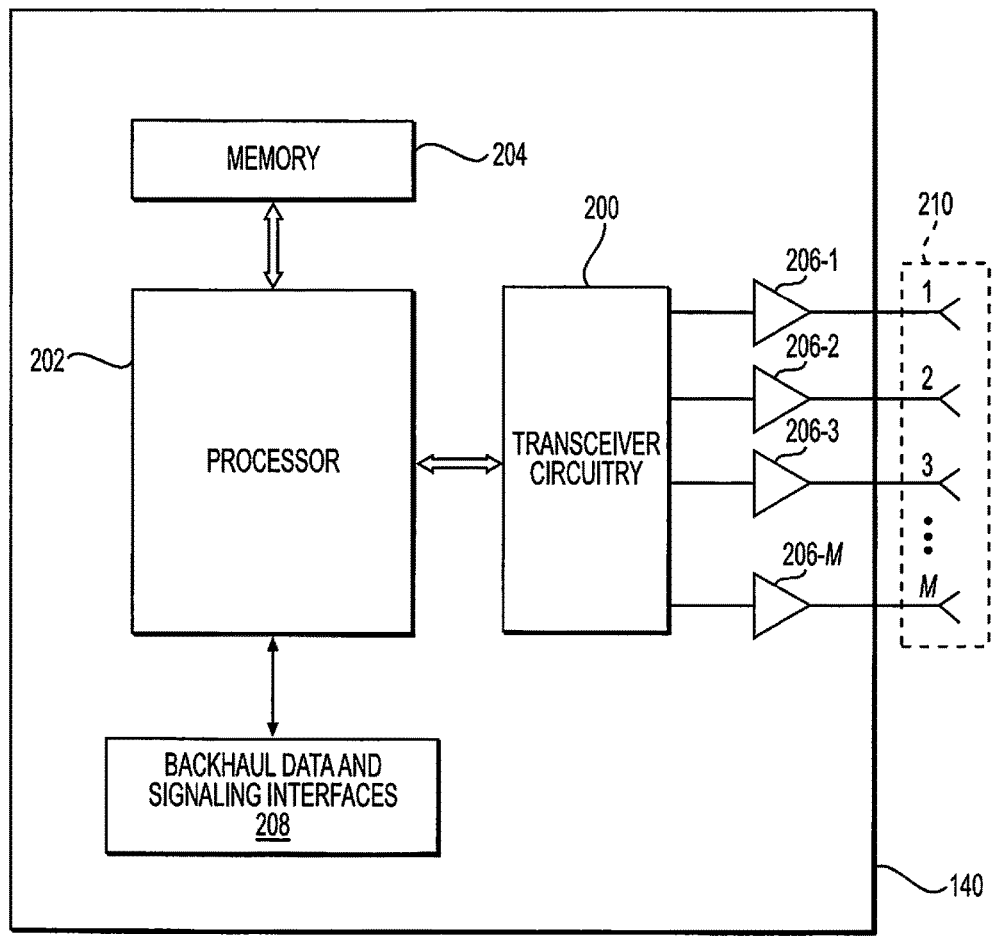
FIG. 2 is a block diagram illustrating an example embodiment of the MIMO system central node 140 shown in FIG. 1.

FIG. 2 is a block diagram illustrating an example embodiment of the MIMO system central node 140 shown in FIG. 1.

Referring to FIG. 2, the base station 140 may include one or more of: transceiver circuitry 200; a processor (or processing circuit) 202; a memory 204; and backhaul data and signaling interfaces 208.

The processor 202 may control the function of base station 140 (as described herein), and is operatively coupled to the memory 204, the transceiver circuitry 200, and the backhaul data and signaling interfaces 208. While only one processor 202 is shown in FIG. 2, it should be understood that multiple processors (or pools of processors) may be included in a typical base station, such as the base station 140. The functions performed by the processor may be implemented using hardware. As discussed above, such hardware may include CPUs, DSPs, ASICs, FPGAs, computers, or the like. The term processor or processing circuit used throughout this document may refer to any of these example implementations, though the term should not be limited to these examples.

Still referring to FIG. 2, the transceiver circuitry 200 (also referred to as a transceiver or communication interface) is further coupled to M antennas of a MIMO antenna array (also sometimes referred to herein as a "Large-Scale Antenna Array" and/or 'antenna array') 210 via respective power amplifiers 206-1, 206-2, . . . , 206-M. Because functions of transceiver circuitry, power amplifiers and antennas are generally well-known, a detailed discussion of these components is omitted. The MIMO antenna array 210 may be a Massive MIMO antenna array. A given MIMO antenna array may include a few tens (e.g., 64) to a few hundreds (e.g., 250), or even a few thousand (e.g., 3000) of antennas depending on space.

The backhaul data and signaling interfaces 208 may interface with other parts of the wireless network, such as the backhaul (e.g., Internet Protocol (IP) or core) network.

The memory 204 may buffer and store data that is being processed at the base station 140, transmitted and received to and from base station 140. The memory 204 may also store computer program instructions for controlling operation of the base station 140.

The memory 204 may be a computer readable storage medium that generally includes a random access memory (RAM), read only memory (ROM), and/or a permanent mass storage device, such as a disk drive. The memory 204 also stores an operating system and any other routines/modules/applications for providing the functionalities of the base station 140 (e.g., functionalities of a Massive MIMO base station, methods according to the example embodiments, etc.) to be executed by the processor 202. These software components may also be loaded from a separate computer readable storage medium into the memory 204 using a drive mechanism (not shown). Such separate computer readable storage medium may include a disc, tape, DVD/CD-ROM drive, memory card, or other like computer readable storage medium (not shown). In some embodiments, software components may be loaded into the memory 204 via one or more interfaces (not shown), rather than via a computer readable storage medium. The memory 204 may be a non-transitory computer readable storage medium.

As will be appreciated, depending on implementation, the MIMO system central node 140 may include additional components other than those shown in FIG. 2. However, it is not necessary that all of these generally conventional components be shown in order to convey illustrative example embodiments to persons having ordinary skill in the art.

Still referring to FIG. 2, according to at least one example embodiment, the MIMO system central node 140 may function in two modes: 1) a training mode (also referred to as a calibration mode) in which the MIMO system central node 140 obtains channel knowledge (also referred to as channel estimates or channel state information (CSI)); and 2) a normal transmission mode in which the MIMO system central node 140 performs normal backhaul transmission and reception of signals to and from the K relay cells 120-1 through 120-K via the MIMO antenna array 142.

Operations of the MIMO system central node 140 shown in FIG. 2 will be discussed in more detail below.

Still referring to FIG. 2, in at least one example embodiment, at least one of the relay cells 120-1 through 120-K may include one or more of the elements included in the example embodiments of the base station 140 as illustrated in FIG. 2. For example, a k-th relay cell 120-k may include at least one of processor 202, memory 204, transceiver circuitry 200, one or more antennas 210, one or more power amplifiers 206-1 to 206-M, some combination thereof, or the like. A quantity "M" of antennas in a relay cell may be one (1), such that the k-th relay cell includes a single antenna 210.

In at least one example embodiment, at least one or more elements of communications networks described herein, including one or more base stations ("central nodes") may be implemented using network functions virtualization (NFV). NFV is a network architecture that makes use of technologies of computer virtualization. In at least one example embodiment, an entirety of one or more instances of network equipment (e.g., a central node 140) or one or more parts thereof or part of their functions can be virtualized. Such virtualization may be implemented using software building blocks that may connect, or interact, to create communication services.

A virtualized network function of e.g. a base station may include at least one virtual machine running different software and processes, on top of standard high-volume servers, switches and storage, or a cloud computing infrastructure, instead of having customized hardware appliances for each network function.

As such, a base station ("central node") function may be implemented using a computer program product ("computer readable instructions," "computer-executable programs of instruction," etc.) embodied on a non-transitory computer readable storage medium for performing one or more operations, wherein the computer program product comprises one or more instructions, that when executed by a processor, cause the processor to perform the one or more operations of the specific base station function.

In at least one example embodiment, a radio interface of a base station and/or a radio interface of an access point could be located in one location and at a remote location, e.g. connected via optical links, corresponding processing functions can be implemented. For example, a processor that executes computer program product to perform one or more operations of a base station function may be remotely located, relative to one or more antennas with which the processor may interact to perform the one or more operations of the base station function. In another example, at least one of the processor 202 and the memory 204 may be remotely located relative to at least the M antennas 210. The at least one of the processor 202 and the memory 204 may be communicatively coupled ("communicatively linked") to the array 142 of M antennas 210 through one or more communication networks. Such remotely located (e.g., "distributed") elements may be referred to as a distributed base station ("distributed central node"). The distributed central node may transmit signals based on the signals being generated at the processor 202, communicated from the processor 202 to the antenna array 142, and transmitted from the array 142 to one or more relay cells 120-1 to 120-K. The distributed central node may receive signals based on the signals being received at the array 142 of M antennas 210, communicated to the processor 202 from the antenna array 142, and received at the processor 202 from the array 142.

Figure 3:
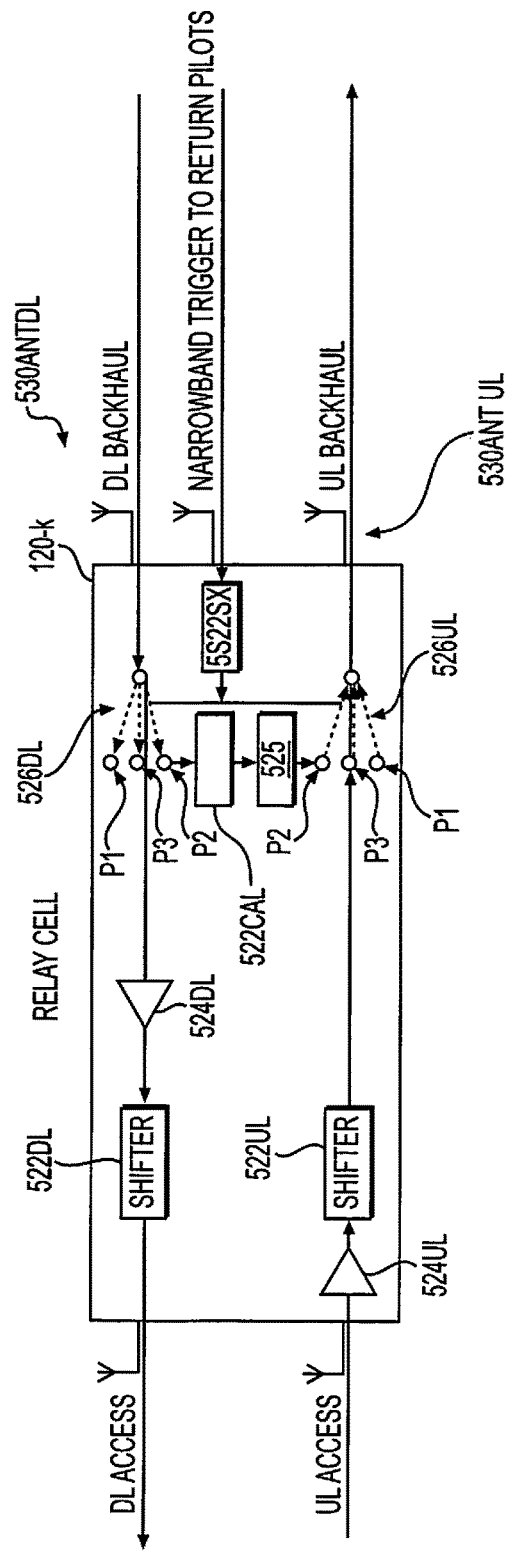
FIG. 3 is a block diagram illustrating an example embodiment of a k-th relay cell 120-k shown in FIG. 1.

FIG. 3 is a block diagram illustrating an example embodiment of the k-th relay cell 120-k. Although only a single relay cell is discussed herein, each of the K relay cells 120-1 through 120-K may be configured and operate in the same or substantially the same manner.

Referring to FIG. 3, the k-th relay cell 120-k includes a switch controller 522SX that controls a downlink three-way switch 526DL and an uplink three-way switch 526UL according to the auxiliary trigger signal received from the MIMO system central node 140. In the training mode, the three-way switches 526UL and 526DL feed the received signals through a shifter 522CAL that includes a mixer to convert the received analog M×1 pilot signal from the downlink carrier frequency to the uplink carrier frequency for retransmission to the MIMO system central node 140 during a given pilot duration. In a digital assisted relay cell, the shifter 522CAL may also perform some filtering of the received signals. The M×1 signal may be received at the k-th relay cell 120-k as a scalar (1×1) signal, a linear combination of transmissions from the M antennas of the MIMO system central node 140.

In more detail, based on the auxiliary trigger signal from the MIMO system central node 140, the switch controller 522SX sets each of the three-way switches 526DL and the 526UL into one of three operating positions.

When the three-way switches 526DL and 526UL are in a first position P1, the relay cell does not transmit on the uplink of the backhaul link or on the downlink of the access link; that is, the relay cell is silent or muted.

When the switch controller 522SX sets the three-way switches 526UL and 526DL in the second position P2, the M×1 pilot signal received from the MIMO system central node 140 on the downlink is fed through the shifter 522CAL. The shifter 522CAL converts the downlink M×1 pilot signal from the downlink carrier frequency to an uplink carrier frequency, and outputs the converted M×1 pilot signal to the three-way switch 526UL for retransmission to the MIMO system central node 140 on the uplink.

The k-th relay cell 120-k includes a configurable gain 525, in series with the shifter 522CAL. The configurable gain 525 may multiply the converted signal by a specified gain. The specified gain, sometimes referred to herein as a "loop-back gain," may depend on an interval "t" and on the relay cell 120-k.

When the three-way switches 526DL and 526UL are in a third position P3, the relay cell 120k performs normal relay of signals on the uplink and downlink. For normal relaying of signals on the downlink, the downlink backhaul signal is received from the MIMO system central node 140 by the downlink transceiver antenna 530ANTDL at a carrier frequency of about 5.6 GHz, and input to the amplifier 524DL. The amplifier 524DL amplifies the received backhaul signal, and outputs the amplified downlink backhaul signal to the downlink shifter 522DL. The downlink shifter 522DL frequency-converts the amplified downlink backhaul signal to the downlink access carrier frequency of about 2.65 GHz, and the relay cell 120-k transmits the converted downlink signal to the UEs served by the relay cell 120-k.

On the uplink, the relay cell 120-k receives a combined uplink access signal from the UEs served by the relay cell 120-$k$ at a carrier frequency of about 2.55 GHz. The received uplink access signal is input to the amplifier 524UL, which amplifies the combined access signal from the UEs and outputs the amplified combined signal to the uplink shifter 522UL. The uplink shifter 522UL frequency-converts the amplified combined signal to the uplink backhaul carrier frequency of, for example, about 2.1 GHz or 5.5 GHz for transmission to the MIMO system central node 140 by the uplink transceiver antenna 530ANTUL on the uplink backhaul between the relay cell 120-$k$ and the MIMO system central node 140.

The frequency converted signal is output to the uplink three-way switch 526UL, and then transmitted by the relay cell 120-$k$ to the MIMO system central node 140 via the uplink transceiver antenna 530ANTUL. The relay cell 120-$k$ may simultaneously and/or concurrently transmit uplink and downlink signals to and from the UEs served by the relay cell 120-$k$.

Figure 4:
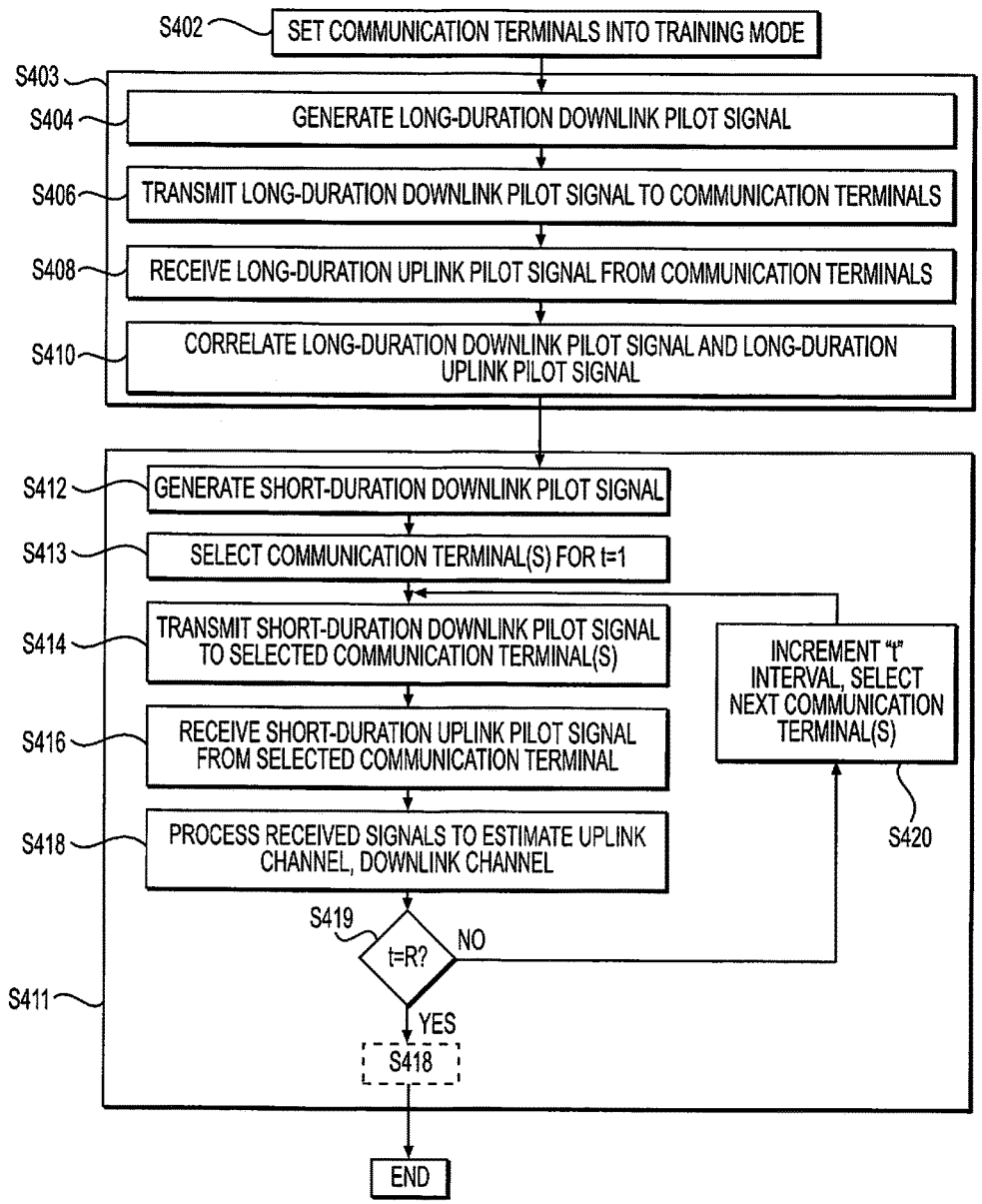
FIG. 4 is a flow chart illustrating a method for obtaining channel estimates for propagation channels between a MIMO central node and one or more communication terminals, according to some example embodiments.

FIG. 4 is a flow chart illustrating a method of operation of the central node of a MIMO system, according to at least one example embodiment. The central node may be a central node of a Massive MIMO system. The method of operation illustrated in FIG. 4 may be implemented, at least in part, by one or more elements of a distributed central node. For example, one or more of the operations illustrated in FIG. 4 may be implemented by a processor that may be communicatively linked (e.g., through a communication network) with a remotely-located antenna array. The processor may execute computer-readable instructions to generate signals for transmission by the antenna array, communicate the signals to the antenna array, some combination thereof, or the like. The processor may receive signals from communication terminals based on the signals being received at the antenna array from the communication terminals and the signals further being received at the processor from the antenna array.

Referring to FIG. 4, the method of operation illustrated therein may be performed by a central node in a MIMO system that includes one or more communication terminals. The description of the method with regard to FIG. 4 refers to example embodiments of the MIMO system that include multiple communication terminals (e.g., K>1). However, the example embodiments are not limited thereto and include example embodiments where the MIMO system includes an individual communication terminal (K=1).

As discussed above, the MIMO system central node 140 may utilize uplink and downlink channel estimates to properly pre-code signals for backhaul transmission on the downlink (i.e., from MIMO system central node to communication terminal), and to properly decode signals received on the uplink (i.e., from communication terminal to MIMO system central node). The acquisition of these uplink and downlink channel estimates is accomplished during the training phase.

For example, where $G_d$ and $G_u$ denote M×K downlink and uplink propagation channel matrices, the method illustrated in FIG. 4 may enable the estimation of the matrices (up to a scalar ambiguity in each column), so that they may be used for communication between the MIMO system central node 140 and the communication terminals 120-1 to 120-$k$. The method may enable noise reduction and reduced and/or minimized utilization of time samples to estimate the matrices. A downlink propagation channel may be referred to herein as a "downlink channel" and/or a "downlink," and an uplink propagation channel may be referred to herein as an "uplink channel" and/or an "uplink."

Referring now to FIG. 4, at step S402 the MIMO system central node 140 may set the K communication terminals 120-1 through 120-K into a training mode. In more detail, for example, the central node 140 may generate and output (e.g., transmit) an auxiliary trigger signal to the K relay cells 120-1 through 120-K through the M antennas of the antenna array 210.

In at least one example embodiment, the MIMO system central node 140 may enter the training mode when (i) channel information is deemed to have deteriorated sufficiently such that the channels should be re-estimated, (ii) when a new communication terminal enters the system, (iii) at the direction of a network operator, (iv) periodically depending on the variability of the channel (e.g., every few minutes, several times per second, etc.), etc. If the MIMO system central node 140 enters the training mode periodically, the period may be specified by a network operator, but the actual entering of the training mode may be triggered without operator interaction, such as by one or more timers.

In at least one example embodiment, the auxiliary trigger signal is an off-band signal with relatively low transmission rate and relatively simple modulation and coding. This auxiliary trigger signal includes an individual code sequence for each of the communication terminals, causing each of the relay cells to successively and/or sequentially switch into a pilot retransmission mode for one pilot duration. In other words, the auxiliary trigger signal also successively designates, during successive pilot durations (and/or training phases), a relay cell from among the K communication terminals 120-1 through 120-K to retransmit the pilot signal received from the MIMO system central node 140.

In at least one example embodiment, digital processing at a communication terminal may be used to extract the symbol (e.g., OFDM symbol) boundaries of the backhaul signals to improve synchronization and/or relax the requirements of the off-band signal. In at least one example embodiment, the trigger may be fully in-band of the backhaul signals and recovered by (selective) digital signal processing at the communication terminals. This is sometimes referred to as "digital assisted pilot retransmission".

According to at least one example embodiment, the auxiliary trigger signal is not transmitted with the bandwidth and array gain and directivity of the central node antenna array, but in a narrowband auxiliary control channel with an omni-directional antenna pattern.

In at least one example embodiment, to obtain the channel knowledge for the propagation channels between the antenna array 210 and a k-th communication terminal during the training phase, the MIMO system central node 140 may rely on only the k-th communication terminal 120-$k$ returning the downlink pilots on its uplink backhaul connection with the MIMO system central node 140, while all of the other (K−1) communication terminals are muted or silent. To do so, the MIMO system central node 140 may utilize the auxiliary trigger signal to inform each of the K communication terminals when normal access to the backhaul connection with the MIMO system central node 140 on the uplink is suspended for pilot transmission.

If and/or when the k-th communication terminal 120-$k$ is to be designated to retransmit pilot signals received from the MIMO system central node 140, the auxiliary trigger signal may instruct the k-th communication terminal 120-$k$ to enter the pilot transmission mode in which the k-th communication terminal 120-$k$ suspends normal transmission activities, but retransmits, on the uplink during a subsequent pilot duration, pilot signals received from the MIMO system central node 140 on the downlink. During this pilot duration, the auxiliary trigger signal received by the other (K−1) communication terminals may instruct the (K−1) other communication terminals to enter the silent mode, in which each communication terminal suspends normal transmission activities and does not retransmit pilot signals from the MIMO system central node 140.

In at least one example embodiment, the analog k-th communication terminal 120-*k* may retransmit the pilot signals instantaneously. In a digital assisted communication terminal, the retransmission may be shifted (e.g., by about one OFDM symbol or subframe) by a processing delay at the communication terminal.

As shown in FIG. 4, the estimation process may include a downlink characterization pilot phase (S403) and an uplink characterization pilot phase (S411). The downlink characterization pilot phase may be referred to herein as a "long-duration" pilot phase, and the uplink characterization pilot phase may be referred to herein as a 'short-duration' pilot phase.

Downlink Characterization Pilot Phase

Still referring to FIG. 4, at S404 the MIMO system central node 140 may generate a "long-duration" downlink pilot signal. The long-duration downlink pilot signal may include ("carry") a first set of one or more first pilot sequences of a first duration ("$\tau_d$"). The first duration "$\tau_d$" may be equal to or greater than a quantity 'M' of antennas in the antenna array. Thus, the one or more first pilot sequences may have a sample duration $\tau_d \geq M$. The long-duration downlink pilot signal may be referred to herein as a downlink characterization pilot signal.

In at least one example embodiment, the first set of one or more first pilot sequences of the first duration are mutually orthogonal. The first set of one or more first pilot sequences of the first duration may be mutually orthogonal in at least one of a frequency domain and a time domain. The first set of one or more first pilot sequences may extend over a frequency/time index.

As described herein, the one or more first pilot sequences included in the long-duration pilot signal may be represented by a $\tau_d \times M$ matrix "$\Psi$."

In at least one example embodiment, the matrix "$\Psi$" may be normalized. The one or more first pilot sequences may be column-wise unitary, such that $\Psi^H \Psi = I_M$, where the superscript "H" denotes "conjugate transpose."

At S406, the MIMO system central node 140 transmits the long-duration downlink pilot signal to the K communication terminals 120-1 to 120-K simultaneously or substantially simultaneously through the M antennas.

In at least one example embodiment, the M antennas of the MIMO system central node 140 may, over $\tau_d$ time samples, transmit a long-duration downlink pilot signal that includes a normalized one or more first pilot sequences. Such a transmitted long-duration downlink pilot signal including a normalized one or more first pilot sequences may be expressed as Equation (1) below, where the average transmit power per time sample is $\rho_d$:

$$X_d = \sqrt{\frac{\rho_d \tau_d}{M}} \Psi^H \tag{1}$$

At S408, the MIMO system central node 140 receives a plurality of long-duration signals from the K communication terminals 120-1 to 120-K simultaneously or substantially simultaneously. The plurality of long-duration signals may collectively comprise a long-duration uplink pilot signal received from the K communication terminals. Receiving the plurality of long-duration signals from the K communication terminals 120-1 to 120-K simultaneously or substantially simultaneously may be referred to as receiving a long-duration uplink pilot signal from the K communication terminals 120-1 to 120-K. Each long-duration signal may be received from a separate communication terminal. Each long-duration signal may be a retransmitted long-duration downlink pilot signal from the separate, respective communication terminal.

The K communication terminals may collectively receive the long-duration downlink pilot signal on separate, respective downlink channels, or "downlinks," as a $K \times \tau_d$ signal that may be expressed by Equation 2, below, where $V_d$ represents noise:

$$Y_d = \sqrt{\frac{\rho_d \tau_d}{M}} G_d^T \Psi^H + V_d \tag{2}$$

The K communication terminals may all simultaneously or substantially simultaneously loop-back ("retransmit") the signals received on the respective downlink channels from the MIMO system central node 140. The communication terminals may retransmit the respectively-received signals on respective uplink channels, or "uplinks," to the central node. The resulting looped signals may be referred to individually as "long-duration signals." The long-duration signals received on the separate, respective uplinks by the central node antennas may then be processed by the MIMO system central node 140 as described below.

The communication terminals may be configured to retransmit a received long-duration downlink pilot signal, as a long-duration signal, independently of any digital signal processing.

In some example embodiments, one or more of the K communication terminals may implement a frequency conversion of a received long-duration downlink pilot signal and retransmit the frequency-converted retransmitted long-duration downlink pilot signal as a respective long-duration signal of the respective communication terminal. The long-duration uplink pilot signal received at the MIMO system central node 140 may thus be a frequency-converted retransmission of the long-duration downlink pilot signal by one or more of the K communication terminals.

In at least one example embodiment, a received long-duration downlink pilot signal at a communication terminal may be retransmitted with a scaling factor $\sqrt{\alpha \rho_u}$. The scaling factor may conform to one or more uplink transmit power constraints.

The MIMO system central node 140 may receive the plurality of long-duration signals from the K communication terminals as a "$M \times \tau_d$" long-duration uplink pilot signal that may be expressed by Equation (3) below, where $V_u$ represents further noise:

$$Z_d = \sqrt{\frac{\alpha_u \rho_d \tau_d}{M}} G_u G_d^T \Psi^H + \sqrt{\alpha \rho_u} G_u V_d + V_u \tag{3}$$

In at least one example embodiment, the MIMO system central node 140 may utilize the received long-duration uplink pilot signal to estimate a concatenation of the uplink channel and the downlink channel: $G_u G_d^T$. Such a concatenation may be referred to herein as a "loop-back channel."

At S410, the MIMO system central node 140 may correlate the long-duration uplink pilot signal received at the MIMO system central node 140 with one or more first pilot sequences of the long-duration downlink pilot signal to generate a pilot signal matrix.

For example, each of the M antennas of the central node may correlate the respective received long-duration uplink pilot signal with each of the K pilot sequences to generate an M×M pilot signal matrix as expressed by Equation (4) below:

$$Y_{du}\Psi = \sqrt{\frac{\alpha\rho_u\rho_d\tau_d}{M}} G_u G_d^T + \sqrt{\alpha\rho_u} G_u V_d' + V_{du}' \quad (4)$$

Uplink Characterization Pilot Phase

The uplink characterization phase (S411) may include a sequence of R intervals, where the total quantity "R" of the intervals "t" is equal to or greater than the quantity "K" of communication terminals, such that R≥K. Each separate interval "t" may be associated with selection of a separate communication terminal of the communication terminals 120-1 to 120-K.

At S412, during the uplink characterization phase S411, the MIMO system central node 140 may generate a "short-duration" downlink pilot signal. The short-duration downlink pilot signal may include ("carry") a second set of one or more second pilot sequences of a second duration ("$\tau_u$"). The second duration may be greater than a value of 1. The second duration "$\tau_u$" may be less than or equal to the quantity "M" of antennas in the antenna array of the central node 140. Thus, the one or more second pilot sequences may have a sample duration $\tau_u$<M. In at least one example embodiment, the one or more second pilot sequences may have a sample duration $\tau_u$ that is greater than 'M'. The short-duration downlink pilot signal may be referred to herein as an uplink characterization pilot signal.

In at least one example embodiment, the second set of one or more second pilot sequences of the second duration are mutually orthogonal. The second set of one or more second pilot sequences of the second duration may extend over an antenna index of the antenna array.

The short-duration downlink pilot signal may carry a second set of one or more second pilot sequences that may be represented by an M×$\tau_u$ matrix "Φ." The matrix may be normalized such that trace $\{\Phi\Phi_H\}$=M. In at least one example embodiment, m may have orthogonal columns, such that $$\Phi^H \Phi = \frac{M}{\tau_u} I_{\tau_u}.$$

At S413, at least one communication terminal of the K communication terminals 120-1 to 120-K may be selected for the first interval (t=1) of the R intervals. Selecting a given one or more communication terminals may include transmitting a trigger signal to the given one or more communication terminals to configure the given one or more communication terminals to receive and retransmit pilot signals. Selecting the given one or more communication terminals may include transmitting a trigger signal to a remainder of the communication terminals to inhibit retransmission (looping-back) of pilot signals back to the central node.

At S414, during each interval t, the MIMO system central node 140 may transmit the short-duration downlink pilot signal on a downlink to the selected communication terminal. As shown in FIG. 4, each interval is associated with a separate communication terminal and may be implemented iteratively ("sequentially") until a separate interval "t" has been implemented at least once for each separate communication terminal 120-1 to 120-K.

At S416, during each interval t, the MIMO system central node 140 may receive a short-duration uplink pilot signal from the selected communication terminal on an uplink. The short-duration uplink pilot signal may be a retransmitted short-duration downlink pilot signal. The short-duration uplink pilot signal may be a frequency-converted retransmitted short-duration downlink pilot signal.

During each interval, the selected communication terminal may loop-back ("retransmit") the received short-duration downlink pilot signal as a short-duration uplink pilot signal. The retransmitted signal may be the received short-duration downlink pilot signal that is multiplied by a specified gain. The specified gain may depend on the interval "t" and on the communication terminal.

The set of loop-back gains across the R intervals in the uplink characterization phase may be represented by a K×R matrix W. The loop-back gain of a given "k-th" communication terminal during a given interval "t" may be referred to as $W_{kt}$.

In at least one example embodiment, the values $W_{kt}$ may be selected from a limited set. For example, allowing $W_{kt}\in\{0,1\}$ means that the communication terminal may either loop-back the signal or not, while allowing $W_{kt}\in\{-1, 0,1\}$ means the communication terminal may, in addition, loop-back the signal with an inverted sign.

Enabling the values $W_{kt}$ to be selected from a limited set may enable a simplification of the design of the communication terminal.

In at least one example embodiment, in addition to choosing W to have elements from a limited alphabet, W may be full rank, such that W has a pseudo-inverse $W^* = W^H (WW^H)^{-1}$ satisfying $WW^* = I$.

In at least one example embodiment, R=K (the quantity of communication terminals), and $W=W^*=I_K$, (i.e. the K×K identity). This may correspond to the communication terminals providing loop-back of a short-duration downlink pilot signal sequentially (e.g., "iteratively," "one at a time," etc.).

In at least one example embodiment, R is a power of two (e.g., 2, 4, 8, 16, etc.), R is greater than or equal to K, W is any K rows of an R×R Walsh-Hadamard matrix (values in (−1,1)), and $W^*=W^T/R$. This may correspond to example embodiments where all communication terminals provide loop-back of a short-duration downlink pilot signal during all intervals (e.g., simultaneously or substantially simultaneously).

In at least one example embodiment, R a power of two (e.g., 2, 4, 8, 16, etc.), R is greater than or equal to K+1, U is any K rows of an R×R Walsh-Hadamard matrix excluding the constant row [1 1 . . . 1], W is given by W=(U+1)/2 (taking values in {0,1}) and $W^*=2U^T/R$. This may correspond to example embodiments where each communication terminal provides loop-back of a short-duration downlink pilot signal during half of the R intervals.

In at least one example embodiment the short-duration downlink pilot signal is transmitted to all K communication terminals simultaneously or substantially simultaneously, and all K communication terminals retransmit ('loop-back') the respectively-received short-duration downlink pilot signals as separate, respective short-duration signals simultaneously or substantially simultaneously.

The separate, respective short-duration signals may be encoded according to one or more orthogonal codes. Such encoding may be implemented with analog circuitry. An orthogonal code may be a modulated value sequence. Each modulated value sequence may be a Walsh-Hadamard code. Each Walsh-Hadamard code may include a modulated value sequence such that each value in the sequence is −1 or 1. Each Walsh-Hadamard code may include a modulated value sequence such that each value in the sequence is 0 or 1. In at least one example embodiment, one value in the sequence represents retransmission and the other value represents omitting retransmission. For example, where a Walsh-Hadamard code includes a modulated character sequence such that each value in the sequence is 0 or 1, a value of "0" represents omitting retransmission of a particular signal in a corresponding sequence of signals, while a value of "1" represents retransmitting a particular signal in a corresponding sequence of signals.

Referring back to S414, the short-duration downlink pilot signal transmitted by the MIMO system central node 140 in a given interval "t" may be expressed by Equation (5) below, and the received short-duration downlink pilot signal at the K terminals may be expressed by Equation (6) below:

$$X_u = \sqrt{\frac{\rho_d \tau_u}{M}} \Phi \quad (5)$$

$$Y_u[t] = \sqrt{\frac{\rho_d \tau_u}{M}} G_d^T \Phi + V_u[t] \quad (6)$$

For a given interval "t," a loop-back matrix L[t] may be defined as a K×K diagonal matrix with $L_{kk}[t]=W_{kt}$. The K communication terminals may collectively multiply the received short-duration downlink pilot signal ($Y_u$) by this loop-back matrix before retransmitting it to the MIMO system central node 140 on separate, respective uplink channels. Then, the short-duration uplink pilot signal received at antennas of the central node 140 during interval "t" may be an M×$\tau_u$ signal. The received short-duration uplink pilot signal in a given interval "t" may be expressed by Equation (7) below:

$$Z_d[t] = \sqrt{\frac{\alpha \rho_u \rho_d \tau_u}{M}} G_u L[t] G_d^T \Phi + \sqrt{\alpha \rho_u} G_u L[t] V_d[t] + V_u[t] \quad (7)$$

At S418, the MIMO system central node 140 may process one or more of the received long-duration uplink signal and the receive short-duration uplink signal to estimate at least one of an uplink channel between the central node 140 and at least the selected one or more communication terminals and a downlink channel between the central node 140 and at least the selected one or more communication terminals. For example, based on the received short-duration uplink pilot signal, the MIMO system central node 140 may estimate the uplink channel $G_u$. In at least one example embodiment, the MIMO system central node 140 may estimate the uplink channel $G_u$ based on the received short-duration uplink pilot signal and the pilot signal matrix generated at S410.

In at least one example embodiment, the MIMO system central node 140 may estimate the downlink channel $G_d$ based on the estimated uplink channel $G_u$. In at least one example embodiment, the MIMO system central node 140 may estimate the downlink channel $G_d$ based on the estimated uplink channel G and the pilot signal matrix generated at S410.

At S419, the central node determines whether the present interval t is the final interval (t=R). If not, at S420, the central node increments the interval and selects a next set of one or more communication terminals associated with the next interval. The central node then repeats S414-S419 until the present interval t is the final interval (t=R).

Signal Processing: Terminal Discrimination

Referring back to S418, the MIMO system central node 140 may implement one or more signal processing methods to estimate one or more of the uplink channel and the downlink channel between the central node 140 and one or more communication terminals.

In at least one example embodiment, the processing operation S418, which may be referred to as "signal processing," may be implemented subsequent to implementing all "R" intervals, such that the processing is implemented if and/or when "t" is found to equal "R" at S419. Thus, in at least one example embodiment, S418 is implemented subsequent to S419 and if t=R in S419.

In at least one example embodiment, if and/or when the processing step S418 is implemented after all "R" intervals have been implemented (e.g., if t=R at S419), the first step of the processing at S418 may include processing the one or more matrices $Z_u[t]$ expressing the received short-duration uplink pilot signal (Equation (7)) to obtain one or more processed matrices $Z_p[k]$, each of which may be a function of only the k-th column of $G_u$ and $G_d$, denoted $g_{uk}$ and $g_{dk}$ respectively. This may be referred to as terminal discrimination. Terminal discrimination may be implemented via the formula expressed in Equation 8 below:

$$Z_p[k] = \sum_{t=1}^{R} W_{tk}^* Z_u[t] \quad (8)$$

If and/or when W=I, the first step may be omitted, as it may reduce to $Z_p[k]=Z_u[k]$.

In at least one example embodiment, the first step of terminal discrimination may include summing multiple measurements, with corresponding benefits in noise reduction. Noise may be reduced by a factor of R when using the Walsh-Hadamard method and a factor of R/2 when using the shifted Walsh-Hadamard method.

By the definition of L[t] in terms of W, and the fact that WW*=I, it may follow that $$\sum_{t=1}^{R} W_{tk}^* L[t] = e_k e_k^T.$$

That is, a matrix whose k,k-th element is 1 and all other elements are zero.

Thus, based on the above, terminal discrimination may be implemented via the formula expressed below as Equation 9, where $V_{dp}[k]$ and $V_{up}[k]$ are noise terms after processing:

$$Z_p[k] = \sqrt{\frac{\alpha\rho_u\rho_d\tau_u}{M}} G_u e_k e_k^T G_d^T \Phi + \sqrt{\alpha\rho_u} G_u V_{dp}[k] + V_{up}[k] \quad (9)$$

$$= \sqrt{\frac{\alpha\rho_u\rho_d\tau_u}{M}} g_{uk} g_{dk}^T \Phi + \sqrt{\alpha\rho_u} G_u V_{dp}[k] + V_{up}[k]$$

Based on the above processing, the MIMO system central node 140 may generate matrices $Z_d$ and, for $k=1, \ldots, K$, $Z_p[k]$.

Signal Processing: Matrix Processing Methods

The matrices may be processed according to one or more various processing methods, described further below, to generate estimates of $G_u$ and $G_d$.

First Method

In at least one example embodiment, the MIMO system central node 140 may process the above matrices ($Z_d$ and, for $k=1, \ldots, K$, $Z_p[k]$) according to a first method. The first method may be utilized for any value of $\tau_u$, and a general $\Phi$.

In the absence of noise, $Z_p[k]$ may be a rank 1 matrix with left and right singular vectors $g_{uk}$ and $g_{dk}^T\Phi$. Hence, processing the above matrices ($Z_d$ and, for $k=1, \ldots, K$, $Z_p[k]$) according to a first method may include estimating the uplink column $g_{uk}$ as the principle left singular vector of $Z_p[k]$, or equivalently as the principle eigenvector of $Z_p[k]Z_p[k]^H$. This vector may be normalized to unit length.

The estimate of the uplink channel obtained according to the first method may be referred to as $\hat{G}_u$. $\hat{G}_u$, referred to herein as a "first" uplink channel estimate, may be expressed as a matrix, $[\hat{g}_{u1} \ldots \hat{g}_{uK}]$. If and/or when $G_u$ is full rank, $G_d^T$ may be obtained from the product $G_u G_d^T$ by multiplying on the left by the pseudo-inverse $G_u^* = (G_u^H G_H)^{-1}G_u^H$. Hence, an estimate of $G_d$ may be obtained from $\hat{G}_u$ and $Z_d$ as $\hat{G}_d^T = \hat{G}_u^* Z_d$. Such an estimate may be referred to as a second downlink channel estimate.

Second Method

In at least one example embodiment, the MIMO system central node 140 may process the above matrices ($Z_d$ and, for $k=1, \ldots, K$, $Z_p[k]$) according to a second method where the uplink characterization pilot signal may include one or more second pilot sequences $\Phi$ that are generated based on at least one of the transmitted long-duration downlink pilot signal and the received long-duration uplink pilot signal.

For example, the uplink characterization pilot signal ("short-duration downlink pilot signal") may include one or more second pilot sequences $\Phi$ that are generated based on the downlink characterization measurement $Z_d$. As a result, the short-duration downlink pilot signal may be restricted to a particular subspace associated with a downlink channel between the central node and a communication terminal. At least the short-duration uplink pilot signal may be processed according to the subspace associated with the downlink channel, as described below, according to one or more signal processing methods. Thus, a wastage of signal energy in the null space of the downlink channel $G_d^T$ may be reduced and/or minimized.

Processing the above matrices according to the second method may include using singular value decomposition (SVD) to decompose $\bar{Z}_d$ (the complex conjugate of each element of $Z_d$) as expressed by Equation (10) below, where the matrices in the right-hand expression are obtained by retaining only the K largest singular values, and where $B_K$ is a unitary M×K matrix:

$$\bar{Z}_d = ADB^H \approx A_K D_K B_K^H \quad (10)$$

If and/or when the noise is relatively small, $\bar{Z}_d \approx \bar{G}_u G_d^H$ may be approximately rank K, in which case $B_K$ may approximately span the column space of $G_d$, and $A_K$ should approximately span the column space of $\bar{G}_u$.

Processing the above matrices according to the second method may include selecting the uplink characterization pilot ("short-duration downlink pilot signal") to be any matrix of the form $\phi = \bar{B}_K C$, where C is an arbitrary full rank $K \times \tau_u$ matrix normalized such that trace$\{CC^H\} = M$.

Further, to the extent that $A_K$ is a good representation of the columns space of $\bar{G}_u$, the outer product $A_K A_K^T$ may be a projection operator that satisfies $A_K A_K^H \bar{G}_u = \bar{G}_u$. Hence, noise components in $Z_p[k]$ that are not in the column space of $\bar{G}_u$ may be suppressed by multiplying $Z_p[k]$ on the left by this projection matrix, to obtain $Z_p^A[k] = A_K A_K^H Z_p[k]$.

Signal processing according to the second method may then may proceed as described previously with regard to the first method, but where $Z_p^A[k]$ is used in place of $Z_p[k]$ to implement said processing.

Signal processing according to the second method may enable improved quality of the uplink and downlink channel estimates based on avoiding wasted signal energy in transmission and reducing noise energy in reception. In addition to combating background noise, such signal processing may also enable reducing and/or preventing inter-cell interference in systems with multiple central nodes.

In some example embodiments, the two elements of subspace selection (generating short-duration downlink pilot signals based on $B_K$ and filtering received short-duration signals based on $A_K$) may be done in combination, or either may be implemented independently (e.g., without the other).

As described herein, constructing (generating) the one or more second pilot sequences for the short-duration downlink pilot signal based on $B_K$, as described above, may enable the short-duration downlink pilot signal to be restricted to a particular subspace associated with the downlink channel.

As also described herein, filtering $Z_p[k]$ according to $A_K$, as described above, may be referred to as processing the received short-duration uplink pilot signal according a subspace associated with the uplink channel.

Based on processing the above matrices according to the second method, the one or more second pilot sequences $\Phi$ may be generated. The short-duration downlink pilot signal may be transmitted according to the generated one or more second pilot sequences $\Phi$. Subsequent to transmitting the short-duration downlink pilot signal carrying the generated one or more second pilot sequences $\Phi$, the short-duration uplink signal may be received, and the uplink and downlink channels $G_u$ and $G_d$ may be estimated, as described above with regard to the first method.

Third Method

In at least one example embodiment, the MIMO system central node may process the above matrices ($Z_d$ and, for $k=1, \ldots, K$, $Z_p[k]$) according to a third method if and/or when $\tau_u \geq K$. The third method may be utilized in combination with subspace selection, described above regarding the second processing method.

Processing the above matrices according to a third method may include specifying the $K \times \tau_u$ matrix C as a (scaled) unitary matrix, with $CC^H = (M/K)I_K$. This structure may enable generating an estimate of the downlink channel from the uplink characterization phase measurements $\{Z_p[k]\}$.

In at least one example embodiment, an estimate of the product $g_{dk}^T\Phi$ may be generated as the principal right singular vector of $Z_p[k]$, or equivalently as the principal eigenvector of $Z_p[k]^H Z_p[k]$. Such an estimate generation may be similar to the process of obtaining $g_{uk}$ according to the first method.

Based on the special structure of the one or more second pilot sequences $\Phi$ (obtained from $Z_d$ via subspace selection such that the one or more second pilot sequences $\Phi$ are generated according to the second method), an estimate of the vector $g_{dk}^T$ of length M from the vector $g_{dk}^T\Phi$, of length $\tau_u$ may be generated. In particular, because $B_K$ is a unitary matrix that (approximately) spans the column space of $G_d$, the outer product $\Phi\Phi^H = \overline{B}_K CC^H \overline{B}_K^T = (M/K)\overline{B}_K \overline{B}_K^T$ may be a (scaled) projection operator into the column space of $\overline{G}_d$. The outer product may (approximately) satisfy $G_d^T \Phi \Phi^H = (M/K) G_d^T$.

Thus, multiplying the above estimate of $g_{dk}^T \Phi$ by $\Phi^H(K/M)$ (e.g., filtering $Z_p[k]$ according to $\Phi^H$) may result in an estimate of $g_{dk}^T$. Based on such multiplication, the short-duration uplink pilot signal is processed according to the subspace associated with the downlink channel, because the special structure of $\Phi$ is obtained via subspace selection according to the second method. The estimate of the downlink channel obtained in this way may be denoted as $\hat{G}_d^T$. $\hat{G}_d^T$, referred to herein as a "first" downlink channel estimate, may be expressed as a matrix, $[\hat{g}_{d1} \ldots \hat{g}_{dK}]^T$.

Note that, if and/or when $G_d$ is full rank, $G_u$ may be obtained from the product $G_u G_d^T$ based on multiplying on the right by $(G_d^T)^* = \overline{G}_d (G_d^T \overline{G}_d)^{-1}$. Hence, an estimate of $G_u$ may be obtained from $\hat{G}_d^T$ and $Z_d$ as $\hat{G} = Z_d(\hat{G}_d^T)^*$. Such an estimate may be referred to as a second uplink channel estimate.

At this point, estimates $\hat{G}_u$ and $\hat{G}_d^T$ may be obtained based on utilizing the first processing method, and the estimates $\hat{G}_d^T$ and $\hat{G}_u$ may be obtained based on utilizing the third processing method. Further improved estimates can be obtained by combining these estimates, as described further below.

The k-th columns of $\hat{G}_u$ and $\hat{G}_d$ may be "second" estimates of $g_{uk}$ and $g_{dk}$ respectively. These estimates may have the form $\hat{g}_{uk} = \exp(j\gamma_{uk})(g_{uk} + w_{uk})$ and $\hat{g}_{dk} = \exp(j\gamma_{dk})(g_{dk} + w_{dk})$, where $\gamma_{uk}$ and $\gamma_{dk}$ are random (unknown) phases in the interval $[0, 2\pi]$, and $w_{uk}$ and $w_{dk}$ are additive estimation errors.

The estimates $\hat{g}_{uk}$ and $\hat{g}$ and estimates $\hat{g}_{dk}$ and $\hat{g}_{dk}$ may be combined to get new, more accurate, ("third") estimates of $g_{uk}$ and $g_{dk}$. Where estimates $\hat{g}_{uk}$ and $\hat{g}_{uk}$ and estimates $\hat{g}_{dk}$ and $\hat{g}_{dk}$ have random (unknown) phases, the average of $\hat{g}_{uk}$ and $\hat{g}_{uk}$ and the average of $\hat{g}_{dk}$ and $\hat{g}$ may not be simply calculated.

The estimates may be combined through a two-step process. First the argument (phase) of the product of the estimates $\eta_{uk} = \arg(\hat{g}_{uk}^H \hat{g}_{uk})$ and $\eta_{dk} = \arg(\hat{g}_{dk}^H \hat{g}_{dk})$ may be computed. Second, new estimates $\overline{g}_{uk}$ and $\overline{g}_{dk}$ may be computed as $\overline{g}_{uk} = (\exp(j\eta_{uk})\hat{g}_{nk} + \hat{g}_{nk})/2$ and $\overline{g}_{dk} = (\exp(j\eta_{dk})\hat{g}_{dk} + \hat{g}_{dk})/2$.

The new estimates $\overline{g}_{uk}$ and $\overline{g}_{dk}$, referred to herein as "third" uplink channel estimates and "third" downlink channel estimates, respectively, may be used by the MIMO system central node when it forms a precoding matrix for downlink signal transmission to the K users and for forming uplink decoding matrix for receiving uplink signals.

Based on estimating uplink channels and downlink channels between the central node 140 and the communication terminals 120-1 to 120-K according to one or more of the processing methods described above with regard to FIG. 4, non-redundant estimates of the uplink and downlink channels may be generated using fewer resource samples (e.g., as few as 2M+2K resource samples) and independently of (e.g., "without") digital signal processing by the communication terminals. As a result, MIMO system performance may be improved based on reduced resource requirements and processing requirements in the MIMO system. This may enable reduced power consumption requirements of one or more of the central node and the communication terminals, enabling a MIMO system to be implemented with reduced power load.

Based on a reduction in resources used to estimate the uplink and downlink channels, greater scalability of the MIMO system may be achieved. For example, in a MIMO system with a given quantity of central node antennas and a given quantity of available resource samples, the MIMO system may be configured to support a greater quantity of communication terminals based on estimating the uplink and downlink channels according to one or more of the operations described with reference to FIG. 4. As a result, MIMO system performance, including functionality of at least one of the central node 140 and the communication terminals 120-1 to 120-K, may be improved with a given amount of resources available to the MIMO system.

Based on estimating uplink channels and downlink channels between the central node 140 and the communication terminals 120-1 to 120-K according to one or more of the processing methods described above with regard to FIG. 4, the uplink and downlink channels may be estimated in a reduced amount of time, thereby enabling improved performance of the MIMO system. Faster uplink and downlink channel estimation may enable improved functionality of at least one of the central node 140 and the communication terminals 120-1 to 120-K by enabling quicker and more efficient communication.

Estimating the uplink and downlink channels utilizing one or more of the methods described herein may enable improved functioning of one or more computer systems implementing the central node, based on one or more of improved utilization of resources, reduced time requirements to complete the estimating, reduced power consumption requirements associated with reduced resource load, etc.

Estimating the uplink and downlink channels utilizing one or more of the methods described herein may enable improved functioning of one or more communication terminals, based on one or more of improved utilization of resources, reduced time requirements to complete the estimating, reduced power consumption and hardware requirements associated with reduced requirement for digital signal processing, etc. For example, in a MIMO system where uplink and/or downlink channels are estimated according to one or more of the methods described above, digital signal processing may be omitted from the communication terminals 120-1 through 120-K. As a result, hardware requirements and/or power consumption requirements of the communication terminals may be reduced, enabling reduced power supply systems, reduced fabrication cost, reduced computer system requirements, etc. associated with the communication terminals.

Estimating the uplink and downlink channels according to one or more of the methods described herein may enable the central node to estimate the uplink and downlink channels with reduced estimation error. Based on estimating the uplink and downlink channels with reduced estimation error, an error of network communications between the central node and communication terminals may be reduced. Reduced network communication error may enable improved network communications in a MIMO system.

Improved network communications may further improve resource utilization of one or more elements, nodes, terminals, etc. included in the MIMO system. Thus, the functioning of one or more portions of the MIMO network, including functioning of one or more computer systems implementing the central node and/or functioning of one or more communication terminals, may be improved based on the improved uplink and/or downlink channel estimates.

Figure 5:
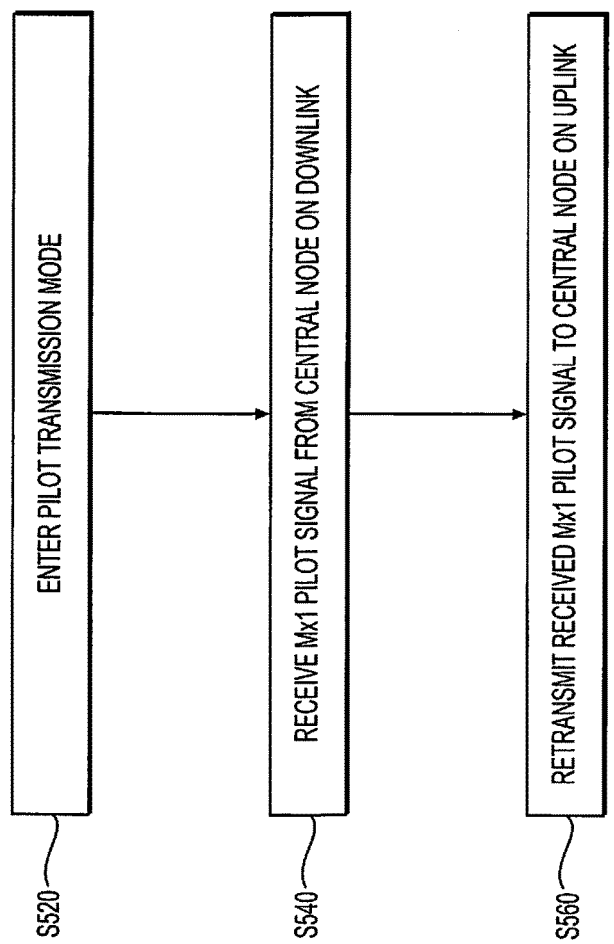
FIG. 5 is a flow chart illustrating a method of operation of the relay cell of FIG. 3, according to some example embodiments.

FIG. 5 is a flow chart illustrating a method of operation of the relay cell of FIG. 3, according to some example embodiments.

Referring to FIGS. 3 and 5, at step S520 the relay cell 120-$k$ enters the pilot transmission mode for a pilot duration in response to receiving the auxiliary trigger signal from the MIMO system central node 140. As mentioned above, in the pilot transmission mode, the switch controller 522SX sets the three-way switches 526UL and 526DL in the second position, such that each of the uplink three-way switch 526UL and the downlink three-way switch 526DL are coupled to the shifter 522CAL.

At step S540, the relay cell 102-$k$ receives a downlink pilot signal from the MIMO system central node 140 at the downlink transceiver antenna 530ANTDL on the downlink. The received downlink pilot signal may be one of a long-duration downlink pilot signal or a short-duration downlink pilot signal. The received downlink pilot signal is fed to the shifter 522CAL by the downlink three-way switch 526DL. The shifter 522CAL converts the received downlink pilot signal from the downlink carrier frequency to the uplink carrier frequency, and outputs the converted downlink pilot signal to the three-way switch 526UL for transmission back to the MIMO system central node 140 by the uplink transceiver antenna 530ANTUL on the uplink at the uplink carrier frequency as an uplink signal that at least partially comprises an uplink pilot signal. The uplink pilot signal may be one of a long-duration uplink pilot signal or a short-duration uplink pilot signal.

At step S560, the relay cell 120-$k$ retransmits the received downlink pilot signal to the MIMO system central node 140 on the uplink via uplink transceiver antenna 530ANTUL.

After retransmitting the received downlink pilot signal back to the MIMO system central node 140 on the uplink, and expiration of the corresponding pilot duration, the relay cell 120-$k$ exits the pilot transmission mode. In an example in which a plurality of training phases are used, after exiting the pilot transmission mode the relay cell 120-$k$ may enter a normal transmission mode and resume normal operation. In an example in which a single training phase is used, after exiting the pilot transmission mode, the relay cell 120-$k$ may become and remain silent until a subsequent auxiliary trigger signal is received from the MIMO system central node 140 setting the relay cell 120-$k$ back to the normal transmission mode. Once set into the normal transmission mode, the relay cell 120-$k$ resumes normal operation by relaying uplink and downlink signals accordingly.

Example embodiments may widen the applicability of relatively low-power consumption relay cells. Example embodiments may also provide a more flexible and relatively low effort deployment of relatively large amounts of relay cells because multiple relay cells can be served with the same wireless backhaul link. The relay cell applies low transmit power on the backhaul uplink, leveraging the MIMO antenna gain, and outsources most of the access and backhaul signal processing into the MIMO central node and the baseband pool. The resulting relatively low power architecture facilitates the practical deployment of renewable energy sources with relay cells thereby reducing the operational expense and the total cost of deployment. The architecture according to one or more example embodiments also allows for the deployment of relay cells at almost any location, independent of the availability of power, for example in bad-grid and off-grid scenarios. Further, the MIMO system backhaul link, which may be a Massive MIMO backhaul link, does not require line-of-sight condition to the central node.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for channel estimation in a multiple-input-multiple-output (MIMO) system, the MIMO system including a central node and a plurality of communication terminals, the central node including an antenna array, the method comprising:

transmitting, by the central node to the plurality of communication terminals simultaneously on separate, respective downlinks of the MIMO system, a long-duration downlink pilot signal carrying a first set of one or more first pilot sequences of a first duration, the first duration being equal to or greater than a quantity of antennas in the antenna array;

receiving, at the central node, a long-duration uplink pilot signal as a plurality of long-duration signals transmitted substantially simultaneously by the plurality of communication terminals on separate, respective uplinks of the MIMO system, each long-duration signal of the plurality of long-duration signals being a retransmission of the long-duration downlink pilot signal by a separate communication terminal of the plurality of communication terminals, each long-duration signal carrying the first set of one or more first pilot sequences;

correlating, at the central node, the received long-duration uplink pilot signal with one or more first pilot sequences of the long-duration downlink pilot signal to generate a pilot signal matrix;

transmitting, by the central node to at least one communication terminal of the plurality of communication terminals on at least one respective downlink of the MIMO system, a short-duration downlink pilot signal carrying a second set of one or more second pilot sequences of a second duration, the second duration being less than or equal to the quantity of antennas in the antenna array;

receiving, at the central node, a short-duration uplink pilot signal carrying the second set of one or more second pilot sequences transmitted by the at least one communication terminal on at least one respective uplink of the MIMO system, the received short-duration uplink pilot signal being a retransmission of the short- duration downlink pilot signal; and estimating an uplink channel between the central node and the at least one communication terminal based on the pilot signal matrix and the received short- duration uplink pilot signal.

2. The method of claim 1, wherein the second set of one or more second pilot sequences is based on the received long-duration uplink pilot signal.

3. The method of claim 1, further comprising:
iteratively performing, for each given communication terminal of the plurality of communication terminals,
transmitting the short-duration downlink pilot signal to the given communication terminal;
receiving the short-duration uplink pilot signal from the given communication terminal; and
estimating an uplink channel between the central node and the given communication terminal based on the pilot signal matrix and the short-duration uplink pilot signal received from the given communication terminal.

4. The method of claim 1, further comprising:
transmitting, by the central node to each communication terminal on separate, respective downlinks of the MIMO system, a sequence of short-duration downlink pilot signals;
receiving separate sequences of short-duration uplink pilot signals from each communication terminal of the plurality of communication terminals, wherein each separate sequence of short-duration uplink pilot signals includes a retransmission of a separate selection of the sequence of short-duration downlink pilot signals received at a separate communication terminal of the plurality of communication terminals, each separate selection being according to a particular orthogonal code associated with the respective communication terminal; and
estimating a plurality of uplink channels between the central node and separate, respective communication terminals of the plurality of communication terminals based on the pilot signal matrix and the sequences of short-duration uplink pilot signals received from the plurality of communication terminals.

5. The method of claim 4, wherein,
each particular orthogonal code is a Walsh-Hadamard code.

6. The method of claim 5, wherein,
each particular Walsh-Hadamard code includes a modulated value sequence such that each character in the modulated character sequence is 0 or 1.

7. The method of claim 1, wherein,
the second set of one or more second pilot sequences of the short-duration downlink pilot signal is generated based on a singular value decomposition of the received long-duration uplink pilot signal, such that,
the short-duration downlink pilot signal is restricted to a particular subspace associated with a downlink channel between the central node and the at least one communication terminal; and
the short-duration uplink pilot signal is processed according to the particular subspace associated with the downlink channel.

8. The method of claim 6, wherein,
the method includes receiving the short-duration uplink pilot signal as a plurality of short-duration signals transmitted sequentially by the plurality of communication terminals on separate, respective uplinks of the MIMO system, each short-duration signal of the plurality of short-duration signals being a retransmission of the short-duration downlink pilot signal received at a separate communication terminal of the plurality of communication terminals; and
the method further includes, generating, for each communication terminal, a first downlink channel estimate and a first uplink channel estimate based on a singular value decomposition of the plurality of short-duration signals received from the plurality of communication terminals, respectively;
generating, for each communication terminal, a second downlink channel estimate and a second uplink channel estimate based on a matrix of the first downlink channel estimates of the plurality of communication terminals and a matrix of the first uplink channel estimates of the plurality of communication terminals, respectively;
calculating, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal;
generating, for each communication terminal, a third downlink channel estimate based on the first and second downlink channel estimates and the downlink argument of the respective communication terminal; and
generating, for each communication terminal, a third uplink channel estimate based on the first and second uplink channel estimates and the uplink argument of the respective communication terminal.

9. The method of claim 1, wherein,
the first set of one or more first pilot sequences of the first duration are mutually orthogonal in at least one of a frequency domain and a time domain.

10. The method of claim 1, further comprising:
estimating a downlink channel between the central node and the at least one communication terminal based on the pilot signal matrix and the estimated uplink channel.

11. The method of claim 1, wherein,
each signal of the plurality of long-duration signals is a frequency converted retransmission of the long-duration downlink pilot signal received at a separate communication terminal of the plurality of communication terminals; and
the received short-duration uplink pilot signal is a frequency converted retransmission of the short-duration downlink pilot signal.

12. The method of claim 1, wherein,
the MIMO system is a Massive MIMO system; and
each communication terminal is a small cell repeater terminal.

13. A multiple-input-multiple-output (MIMO) central node, comprising:
an antenna array;
a memory having computer-readable instructions stored therein; and
a processor configured to execute the computer-readable instructions to,
transmit, to a plurality of communication terminals simultaneously on separate, respective downlinks, a long-duration downlink pilot signal carrying a first set of one or more first pilot sequences of a first duration, the first duration being equal to or greater than a quantity of antennas in the antenna array;
receive a long-duration uplink pilot signal as a plurality of long-duration signals transmitted substantially simultaneously by the plurality of communication terminals on separate, respective uplinks, each long-duration signal of the plurality of long-duration signals being a retransmission of the long-duration downlink pilot signal by a separate communication terminal of the plurality of communication terminals, each signal carrying the first set of one or more first pilot sequences;

correlate the received long-duration uplink pilot signal with one or more first pilot sequences of the long-duration downlink pilot signal to generate a pilot signal matrix;

transmit, to at least one communication terminal of the plurality of communication terminals on at least one respective downlink, a short-duration downlink pilot signal carrying a second set of one or more second pilot sequences of a second duration, the second duration being less than or equal to the quantity of antennas in the antenna array;

receive a short-duration uplink pilot signal carrying the second set of one or more second pilot sequences transmitted by the at least one communication terminal on at least one respective uplink, the received short-duration uplink pilot signal being a retransmission of the short-duration downlink pilot signal; and estimate an uplink channel between the central node and the at least one communication terminal based on the pilot signal matrix and the received short-duration uplink pilot signal.

14. The apparatus of claim 13, wherein the processor is configured to execute the computer-readable instructions to,
iteratively perform, for each given communication terminal of the plurality of communication terminals,
command the antenna array to transmit the short-duration downlink pilot signal to the given communication terminal;
receive the short-duration uplink pilot signal from the antenna array based on the short-duration uplink signal being received at the antenna array from the given communication terminal; and
estimate an uplink channel between the central node and the given communication terminal based on the pilot signal matrix and the short-duration uplink pilot signal received from the given communication terminal.

15. The MIMO central node of claim 13, wherein the processor is configured to execute the computer-readable instructions to,
transmit, to each communication terminal of the plurality of communication terminals simultaneously on separate, respective downlinks, a sequence of short-duration downlink pilot signals; and
receive separate sequences of short-duration uplink pilot signals from each communication terminal of the plurality of communication terminals, wherein each separate sequence of short-duration uplink pilot signals includes a retransmission of a separate selection of the sequence of short-duration downlink pilot signals received at a separate communication terminal of the plurality of communication terminals, each separate selection being according to a particular orthogonal code associated with the respective communication terminal; and
estimate a plurality of uplink channels between the central node and separate, respective communication terminals of the plurality of communication terminals based on the pilot signal matrix and the sequences of short-duration uplink pilot signals received from the plurality of communication terminals.

16. The MIMO central node of claim 13, wherein,
the second set of one or more second pilot sequences of the short-duration downlink pilot signal is generated based on a singular value decomposition of the received long-duration uplink pilot signal, such that,
the short-duration downlink pilot signal is restricted to a particular subspace associated with a downlink channel between the central node and the at least one communication terminal; and
the short-duration uplink pilot signal is processed according to the particular subspace associated with the downlink channel.

17. The MIMO central node of claim 16, wherein,
the processor is configured to execute the computer-readable instructions to receive the short-duration uplink pilot signal as a plurality of uplink signals transmitted sequentially by the plurality of communication terminals on separate, respective uplinks, each uplink signal of the plurality of uplink signals being a retransmission of the short-duration downlink pilot signal received at a separate communication terminal of the plurality of communication terminals; and
the processor is further configured to execute the computer-readable instructions to,
generate, for each communication terminal, a first downlink channel estimate and a first uplink channel estimate based on a singular value decomposition of the plurality of uplink signals received from the plurality of communication terminals, respectively;
generate, for each communication terminal, a second downlink channel estimate and a second uplink channel estimate based on a matrix of the first downlink channel estimates of the plurality of communication terminals and a matrix of the first uplink channel estimates of the plurality of communication terminals, respectively;
calculate, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal;
generate, for each communication terminal, a third downlink channel estimate based on the first and second downlink channel estimates and the downlink argument of the respective communication terminal; and
generate, for each communication terminal, a third uplink channel estimate based on the first and second uplink channel estimates and the uplink argument of the respective communication terminal.

18. A non-transitory computer readable storage medium storing one or more program instructions, the program instructions being executable by a computer system to cause the computer system to,
transmit, to a plurality of communication terminals simultaneously on separate, respective downlinks, a long-duration downlink pilot signal carrying a first set of one or more first pilot sequences of a first duration, the first duration being equal to or greater than a quantity of antennas in an antenna array;
receive a long-duration uplink pilot signal as a plurality of long-duration signals transmitted substantially simultaneously by the plurality of communication terminals on separate, respective uplinks, each long-duration signal of the plurality of long- duration signals being a retransmission of the long-duration downlink pilot signal by a separate communication terminal of the plurality of communication terminals, each signal carrying the first set of one or more first pilot sequences;

correlate the received long-duration uplink pilot signal with one or more first pilot sequences of the long-duration downlink pilot signal to generate a pilot signal matrix;

transmit, to at least one communication terminal of the plurality of communication terminals on at least one respective downlink, a short-duration downlink pilot signal carrying a second set of one or more second pilot sequences of a second duration, the second duration being less than or equal to the quantity of antennas in the antenna array;

receive a short-duration uplink pilot signal carrying the second set of one or more second pilot sequences transmitted by the at least one communication terminal on at least one respective uplink, the received short-duration uplink pilot signal being a retransmission of the short-duration downlink pilot signal; and estimate an uplink channel between a central node and the at least one communication terminal based on the pilot signal matrix and the received short- duration uplink pilot signal.

19. The non-transitory computer readable storage medium of claim 18, wherein, the second set of one or more second pilot sequences of the short-duration downlink pilot signal is generated based on a singular value decomposition of the received long-duration uplink pilot signal, such that, the short-duration downlink pilot signal is restricted to a particular subspace associated with a downlink channel between the central node and the at least one communication terminal; and the short-duration uplink pilot signal is processed according to the particular subspace associated with the downlink channel.

20. The non-transitory computer readable storage medium of claim 19, wherein, the program instructions are executable by the computer system to cause the computer system to receive the short-duration uplink pilot signal as a plurality of uplink signals transmitted sequentially by the plurality of communication terminals on separate, respective uplinks, each uplink signal of the plurality of uplink signals being a retransmission of the short-duration downlink pilot signal received at a separate communication terminal of the plurality of communication terminals; and the program instructions are further executable by the computer system to cause the computer system to, generate, for each communication terminal, a first downlink channel estimate and a first uplink channel estimate based on a singular value decomposition of the plurality of uplink signals received from the plurality of communication terminals, respectively;

generate, for each communication terminal, a second downlink channel estimate and a second uplink channel estimate based on a matrix of the first downlink channel estimates of the plurality of communication terminals and a matrix of the first uplink channel estimates of the plurality of communication terminals, respectively;

calculate, for each communication terminal, a downlink argument and an uplink argument, the downlink argument being an argument of a product of the first and second downlink channel estimates of the respective communication terminal, the uplink argument being an argument of a product of the first and second uplink channel estimates of the respective communication terminal;

generate, for each communication terminal, a third downlink channel estimate based on the first and second downlink channel estimates and the downlink argument of the respective communication terminal; and generate, for each communication terminal, a third uplink channel estimate based on the first and second uplink channel estimates and the uplink argument of the respective communication terminal.

* * * * *